United States Patent
Totty et al.

(10) Patent No.: US 11,367,250 B2
(45) Date of Patent: Jun. 21, 2022

(54) VIRTUAL INTERACTION WITH THREE-DIMENSIONAL INDOOR ROOM IMAGERY

(71) Applicant: Geomagical Labs, Inc., Mountain View, CA (US)

(72) Inventors: Brian Totty, Mountain View, CA (US); Yacine Alami, Mountain View, CA (US); Michael Otrada, Mountain View, CA (US); Qing Guo, Mountain View, CA (US); Hai Shang, Mountain View, CA (US); Aaron Shea, Mountain View, CA (US); Philip Guindi, Mountain View, CA (US); Paul Gauthier, Mountain View, CA (US); Jianfeng Yin, Mountain View, CA (US); Kevin Wong, Mountain View, CA (US); Angus Dorbie, Mountain View, CA (US)

(73) Assignee: GEOMAGICAL LABS, INC., Mountain View, CA (US)

(*) Notice: Subject to any disclaimer, the term of this patent is extended or adjusted under 35 U.S.C. 154(b) by 0 days.

(21) Appl. No.: 16/823,207

(22) Filed: Mar. 18, 2020

(65) Prior Publication Data
US 2020/0302681 A1   Sep. 24, 2020

Related U.S. Application Data

(60) Provisional application No. 62/820,139, filed on Mar. 18, 2019.

(51) Int. Cl.
*G06T 19/00* (2011.01)
*G06T 19/20* (2011.01)
(Continued)

(52) U.S. Cl.
CPC .............. *G06T 15/205* (2013.01); *G06T 7/74* (2017.01); *G06T 19/006* (2013.01); *G06T 19/20* (2013.01);
(Continued)

(58) Field of Classification Search
CPC .......... G06F 30/00; G06F 30/13; G06F 30/27; G06F 30/392; G06T 5/50;
(Continued)

(56) References Cited

U.S. PATENT DOCUMENTS

| | | | |
|---|---|---|---|
| 9,240,077 B1 * | 1/2016 | Kraft | H04N 5/23229 |
| 2008/0071559 A1 * | 3/2008 | Arrasvuori | G06T 19/006 705/26.1 |

(Continued)

*Primary Examiner* — Diane M Wills
(74) *Attorney, Agent, or Firm* — Amardeep S. Grewal; Reed Smith LLP

(57) ABSTRACT

The method for virtual interaction with a three-dimensional indoor room includes: generating a virtual room model, generating a virtual room visual representation, providing the room data to a display device, receiving a virtual object selection, rendering an updated virtual room visual representation based on the virtual object, and providing the updated virtual room visual representation to the display device. The method can optionally include updating virtual room S700. A system for virtual interaction with a three-dimensional indoor room includes: a backend platform and a front end application.

25 Claims, 15 Drawing Sheets

(51) Int. Cl.
*G06T 7/73* (2017.01)
*G06T 15/20* (2011.01)

(52) U.S. Cl.
CPC ............. *G06T 2207/10028* (2013.01); *G06T 2215/16* (2013.01)

(58) Field of Classification Search
CPC ....... G06T 7/10–194; G06T 7/50; G06T 7/74; G06T 7/174; G06T 15/205; G06T 17/05; G06T 19/006; G06T 19/20; G06T 2207/10028; G06T 2207/20084; G06T 2207/20221; G06T 2215/01
See application file for complete search history.

(56) References Cited

U.S. PATENT DOCUMENTS

| | | |
|---|---|---|
| 2011/0213664 A1 | 9/2011 | Osterhout et al. |
| 2015/0325040 A1* | 11/2015 | Stirbu ................. G06T 15/40 345/421 |
| 2015/0356774 A1* | 12/2015 | Gal ..................... G06T 19/20 345/633 |
| 2017/0076490 A1* | 3/2017 | Jenkins ............... G06T 15/005 |
| 2017/0168559 A1* | 6/2017 | Jayadevaprakash ................. G06K 19/06037 |
| 2017/0169617 A1 | 6/2017 | Rodriguez |
| 2017/0243352 A1* | 8/2017 | Kutliroff ............. G06T 19/006 |
| 2017/0323481 A1* | 11/2017 | Tran ................... G06K 9/00771 |
| 2017/0323488 A1 | 11/2017 | Mott et al. |
| 2018/0018553 A1 | 1/2018 | Bach et al. |
| 2018/0095616 A1 | 4/2018 | Valdivia et al. |
| 2018/0112978 A1 | 4/2018 | Burton et al. |
| 2018/0180071 A1 | 6/2018 | Fuhrmann |
| 2019/0026957 A1 | 1/2019 | Gausebeck |
| 2019/0080516 A1* | 3/2019 | Petrovskaya ........ G06T 19/006 |
| 2019/0156393 A1* | 5/2019 | Yankovich ......... G06Q 30/0627 |
| 2020/0051320 A1 | 2/2020 | Laffont et al. |
| 2020/0081249 A1* | 3/2020 | Brusnitsyn ............ G06T 7/13 |
| 2021/0166426 A1* | 6/2021 | Mccormac ............ G06T 7/579 |

* cited by examiner

VIRTUAL INTERACTION WITH THREE-DIMENSIONAL INDOOR ROOM IMAGERY

CROSS-REFERENCE TO RELATED APPLICATIONS

This application claims the benefit of U.S. Provisional Application No. 62/820,139 filed 18 Mar. 2019, which is incorporated in its entirety by this reference.

TECHNICAL FIELD

This invention relates generally to the computer vision field, and more specifically to a new and useful system and method for virtual interaction with three-dimensional indoor room imagery.

BACKGROUND

Virtual interaction with an accurate, generated virtual model of an indoor space is a desirable goal, as such virtual interactions can be useful in a variety of applications, including retail experiences, e-commerce, real estate visualization, architecture and modeling, education, entertainment, and more. An example can serve to demonstrate the current problems with e-commerce in interior décor, and how such a virtual interaction can resolve many issues.

Customers of interior décor retailers (both brick-and-mortar and e-commerce) have found that it is very difficult to imagine home décor products in their spaces. It is hard to know if a piece of décor looks good, if it fits in the room, and if it is the right style that matches with other objects and furniture in the room. Even professionals find that they have trouble visualizing décor in this way. Different products, styles, materials, colors, textures, sizes and shapes are difficult to conceptualize on their own (e.g., how multiple particular objects look together in composition), and even more difficult to imagine in the context of a particular actual three-dimensional space.

Customers face substantial décor imagination difficulties spanning the entire customer journey. Early in the customer journey, customers face a "tyranny of choice" where the sheer volume of product choices overwhelm them, leaving them uncertain where to start. Without assistance to discover products that are relevant and appealing for their spaces and personal style, customers may by paralyzed by uncertainty and choice, and abandon the shopping journey. Later in the journey, customers may find themselves inspired by particular products, but lack confidence that the products will fit in their space, look good in their space, and blend well with other products. Near the end of the commerce journey, the customers may abandon an intended but unconfident purchase because the burden of purchasing mistakes is particularly high. It is painful and costly for customers to return an item if it does not fit in the customer's space. For example, the item may be bulky, there may be shipping or restocking fees, or other concerns can present themselves. As a result of this imagination gap, some people just will not buy, because they do not know the right way to visualize and build confidence about how products and designs would look, fit, and function in the context of their home spaces. Furthermore, the large amount of effort and time required to test how the products and designs would fit within the home cause customers to defer home purchases.

Retailers face related problems. Online digital commerce channels, which have proven very effective for many categories of commerce, may substantially underperform for home décor and furniture. Retailers struggle with how to get online and digitally market their products, how to get consumers to digitally engage with their products, how to get customers confident enough to make décor purchases online without physically touching the object. Retailers want to help inspire customers digitally, get them to discover relevant products, and get them to meaningfully engage with their products online. Retailers want to help customers identify and visualize and identify products for their environment. Retailers also want to enable customers' social engagement about products and services. Retailers would like to increase shopping cart conversion rate and increased shopping cart sizes. They would like to sell coordinating sets and other add-on items. Retailers also want the customers to not return products. They might offer free returns on purchases, but this can present customer experience pain and retailer expenses that can wipe out profits.

Retailers also face challenges in a traditional brick-and-mortar store setting. Customers may be reluctant to buy in store, because they are not certain if a product would fit or look good in their space. Customers may be unsure what products, finishes, colors, styles, or fabrics to select, and be paralyzed by choice. Retailers may find that customers make multiple visits to the store before buying because of lack of confidence that products they see are appropriate in the context of their personal spaces.

Current tools have proven to be unsatisfying in addressing these needs. Analog solutions, such as cutting out pictures, using mood boards, taping outlines to walls, and other techniques are poor substitutes that require time and energy. 3D CAD systems are too complex and expensive for everyday customers to virtually model customer spaces, as they require the painstaking authoring of detailed 3D CAD models, which require hours of work or substantial costs to outsource to professionals or modeling services.

Live augmented reality (live AR) devices (e.g. AR-enabled phones) allow users to stand inside their room and visualize a three-dimensional (3D) product overlaid over live video (as seen by the device's camera) on the device's small display screen. However, live AR is limited for home décor applications in several ways. First, live AR requires the customer to be standing in the room for all browsing and visualization to occur. Customers want to shop and imagine décor in their spaces from many locations (e.g. while browsing a brick-and-mortar furniture showroom, on their at lunch break at work, while riding the train, their feet up on the sofa in a different room, in a café with friends, etc.), so it is desirable to permit portable imagination experiences that decouple a visual model of their space from the physical place. Second, live AR requires the user to explore complex decorating and product choice options through a small screen, held at arm's length, and with a moving camera—a tiring and awkward experience. Enabling portable imagination experiences that can be performed on multiple devices, including laptop or desktop computers, tablets, in-store kiosks, or virtual reality headsets, in addition to smartphones, can be desirable. Third, most contemporary AR systems have a narrow horizontal and vertical field of view, creating a restricted, zoomed-in, porthole-like viewing experience that doesn't accurately depict what the customer would see standing there, and doesn't capture the context and existing furnishings of the space. Enabling imagination experiences that are more expansive, and feel more immersive, can be desirable in order to more completely represent the essence and context of the space. Fourth, because live AR requires real-time execution on a wide range of low-cost devices, compromises in visual rendering may need to be made, such that virtual objects may not look sufficiently realistic when overlaid over videography of a room. For example, camera pose tracking errors may cause virtual objects to visibly move and drift; the brightness, color and shading of objects may look wrong; the shadows may not look realistic; the rendered virtual objects may have different noise characteristics than the photography captured by the device's camera; and the user is not be able to place virtual objects behind actual physical objects seen by the camera, something that affects important metric scale cues and also interferes with the ability to realistically visualize a product.

Thus, there is a need in the computer vision field to create new and useful systems and methods for portable, convenient, expansive, photorealistic, interactive, and/or 3D-aware indoor model(s) generation; and new and useful systems for virtual interaction (e.g., decoration, inspiration, discovery, imagination) of said model. This invention provides such new and useful systems and methods.

DESCRIPTION OF THE PREFERRED EMBODIMENTS

Figure 1:
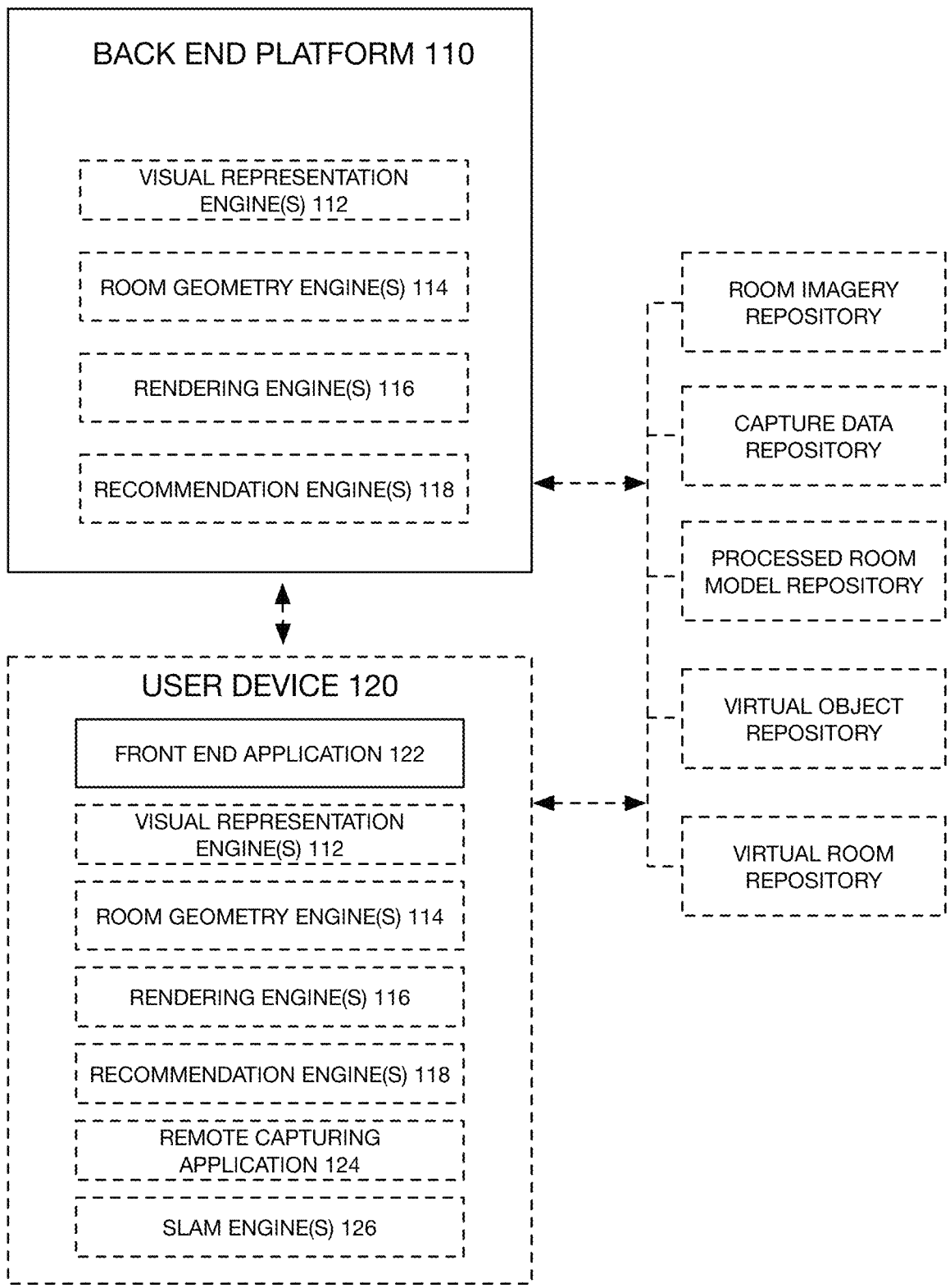
FIG. 1 is a schematic representation of a variation of a system for virtual interaction with generated three-dimensional indoor room imagery.

The following description of the preferred embodiments of the invention is not intended to limit the invention to these preferred embodiments, but rather to enable any person skilled in the art to make and use this invention.

1. Overview

The method for virtual interaction with a virtual room includes: generating a visual scene representation (e.g., wide-angle images of a room, immersive scenes, etc.); generating a virtual room model associated with the visual scene representation; providing the visual scene representation and the virtual room model to a user device; receiving a selection of a virtual object to be composed with the visual scene representation; rendering the virtual object at the virtual position onto the visual scene representation, based on the virtual room model; and providing final rendered visual scene representation for display on one or more devices. The method functions to provide virtual interaction with a generated three-dimensional visual scene representation of an indoor room.

All or portions of the method can be performed at a predetermined frequency, performed upon occurrence of an execution event (e.g., upon a user navigating to a front end application on a user device, upon a user submitting images to a platform, etc.), or performed at any other suitable time. All or a portion of the method can be performed locally at a user device or capture device (e.g., smartphone), remotely at a remote processing system, at a combination thereof, or otherwise performed.

2. Benefits

This method can confer several benefits over conventional methods of providing virtual interaction with three-dimensional (3D) generated room imagery.

First, the method allows users to virtually interact with (e.g., design) their own physical interior spaces (e.g., rooms). In variants, this is based on a user capturing room imagery (e.g., photographs, video, etc.) of the room (e.g., a scene).

Second, the method allows users to directly visualize new objects placed within a rendering of their room, with appropriate 3D awareness, including scale, identification, and depth occlusion of existing objects, placement of virtual objects onto existing objects (e.g., existing physical objects, walls, etc.), and plausible shadows, lighting, and other extracted features of the room. In variants, the method enables dragging a 3D object onto a rendered image (e.g., 2.5D decorating), wherein the rendered image can be automatically updated (e.g., rerendered) to incorporate a 2D version of the 3D object.

Third, the method allows for harmonizing virtually-added objects with the room's visual parameters (e.g., noise; light color, intensity, hue; etc.) for visual consistency.

Fourth, the method allows retailers to build end user experiences tailored to accurate 3D-aware images of their room.

Fifth, the method provides viable online purchasing with higher user certainty of objects fitting within, and optionally stylistically blending with, a user's existing room.

Sixth, the method includes advantages over live AR applications, including the portability to virtually interact with the room while in different physical spaces (i.e. not just while the user is present in the room), greater expansiveness, convenient user interaction on any device and screen size (e.g. rather than forcing all interaction through one hand, on a small screen, while holding a phone screen at arm's length), and improved realism and harmonization of virtual objects with physical objects already in the scene. For example, the user can interact with the virtual room: within the room, in an adjacent room (e.g., of the same building), in a store (e.g., furniture store), in a café, in a showroom, and/or in any other suitable physical space.

Seventh, the method allows for a persistent model in the cloud that is easily sharable and collaborative. For example, the virtual room can be: shared on social media, shared with a collaborator (e.g., interior decorator, friend; such as via a link, a shared API token, a scene identifier, etc.), shared with advertisers (e.g., wherein product advertisements can be set in the context of the user's room), on websites, or otherwise shared. Further, the method enables use across multiple devices (e.g., a smartphone, tablet, laptop, desktop, in store kiosk, and/or any other suitable device).

Eighth, the method enables compelling portable use cases, including the ability to decorate your room from anywhere, the ability to "bring your room to the store", the ability to insert visualization experiences into digital catalogs and advertising units, and the ability to enable remote designers to collaborate on interior designs, and the ability to create social collaboration around design.

Ninth, the method avoids expenses, turnaround time, and other issues with manual CAD modeling and/or rendering by a user or professional hired by the user by automatically generating the visual scene representation and/or virtual model.

Tenth, the method offers a real-time aspect. Once the virtual model is generated, the user can virtually interact with the virtual room in real or near real time. In variants, this can be accomplished by rendering the virtual objects relative to the room image onboard the user device in real or near real time. In variants, the real-time aspect can be enabled by incremental visual scene representation loading and/or incremental improvements in the rendered visual scene representation.

Eleventh, the method offers the ability to interact with physical objects in the captured room, by modeling them in sufficient detail, including the ability to place virtual objects on top of physical objects, remove physical objects to help a consumer imagine objects that are no longer there (e.g. "diminished reality"), and/or to reposition physical objects.

Twelfth, the method offers the ability to personalize product discovery experiences to the spatial and stylistic attributes of a particular room. For example, the method can extract room features (e.g., room dimensions, existing objects, stylistic features, room function/purpose), and personalize product discovery based on the extracted features.

Thirteenth, the method enables the ability to provide automated design guidance, to assist the user with product selection, composition and layouts. For example, the method can automatically recommend new objects (e.g., based on the extracted room features, based on user preferences, etc.), recommend object attributes (e.g., color, size, fabric, etc.), and/or recommend object placement (e.g., for existing and/or new virtual objects), such as based on extracted room features.

3. Example Applications

A first example application for this method includes retail experiences implementing a "try before you buy" system, identifying products for indoor décor, composing collections of products in a room model, and/or enabling in-application purchasing (e.g., a customer selects "buy" in a retail front end application and enters a purchase workflow). For example, remotely or within a retail store, a user may select a virtual object from a repository of virtual objects and place the virtual object into a photorealistic rendered image of the room. The example becomes even more compelling as a user composes multiple products (e.g. paints walls, changes flooring, positions multiple pieces of wall art, and adds multiple furniture pieces).

In a second example, sharing designs or receiving feedback on a set of designs can be desirable by users. For example, other users can collaborate, edit, suggest, recommend, or otherwise socially engage with respect to the designs. In one example, a professional adviser or automated recommendation engine can be employed. In another example, a spouse provides feedback and counter-suggestions. The user can also present an interactive poll to friends asking for advice on multiple selections. The user may share the room as rendered on social media. A gift planning registry may be set up such that other users can purchase items for that user based on visualizations of the items within the user's room. Interactive gameplay may be presented, wherein the rendering is used as a gameplay environment within, e.g., a video game or interactive experience.

In a third example, a website may offer an inspiring collection of pre-captured or synthesized "digital showroom" room models, and allow the user to decorate these as a way of engaging and experimenting with décor products, as promotional or social media campaigns, or as entertainment. These digital showrooms can be representative or aspirational, can be digital representations of in-store or magazine-photographed showrooms, can be rooms belonging to famous entities (e.g., celebrity homes, the "oval office" of the White House, etc.), or be any other suitable room. The virtual rooms may optionally come pre configured with virtual objects the user can manipulate and modify.

In a fourth example, a user visiting a physical store or gallery can "bring their room to the store" by visualizing their room model on a mobile device, an on-premises computer or kiosk, a head-mounted display, or another display device. Users can immediately explore products they see from the store directly in the user's room model (or in pre-captured, inspirational, digital showrooms). Because stores may have limited physical space and therefore may not be able to show all possible products, styles, colors, finishes, it's also valuable to explore photorealistic virtual renderings of products, options and finishes that might not be present in store.

In a fifth example, products that a user sees in an internet advertising unit, a search result, a social media board, or an affiliate feed can be augmented with a "try this in your room" button, that would allow the user to engage with and experiment with products in user-captured room models or pre-generated digital showrooms. In a specific example, the primary client (e.g., advertising unit, social media application, etc.) can access and modify the user's virtual room. In a second specific example, the user's virtual room can pull data from the primary client for virtual room rendering and manipulation.

In a sixth example, users can "forage for interesting products" in the real world. While at stores, other people's homes, hotels, or out and about, the user can use phone cameras and object recognition technology to identify and flag interesting décor objects. For example, users can scan barcodes, price displays with SKUs, QR codes, text names of the product, or physical images of objects of interest. If the product (or a sufficiently similar product) is found in a database of 3D models (e.g., based on values of visual features extracted from the image), the product (e.g., virtual object model thereof) can be directly used in a 3D decorating experience. In a specific example, given sufficient scene data, such as numerous still images (e.g., from one or more vantage points), video, and/or depth scans (e.g., from an RGBD sensor), a 3D representation of the object can be constructed and imported into the decorating experience.

In some embodiments, a representation of the virtual object (e.g., the virtual object identifier, the virtual object modified according to the room model, or other representation) can be stored in association with the virtual room model for the user account (e.g., the base virtual model, a different instance of the virtual room model, an identifier for the virtual room model, the rendering of the virtual room model, and virtual object). The room-object(s) combination can be revisited by the same user account or shared with other user accounts, modified with changes in virtual objects and/or virtual object poses (e.g., wherein the modifications can be stored in association with the room objects combination, or stored as a new room object combination) or otherwise used.

In a seventh example, the method can be used in real estate applications, such as real estate purchase, sale, and/or renting. For example, a prospective buyer or renter can virtually extract the existing objects from their room (e.g., from a virtual room of the buyer or renter's previous living space), scan the room in the prospective house, and virtually model their existing objects in the new space. In a second example, a prospective seller or landlord can scan and virtually stage their rooms, thereby saving on staging costs.

In an eighth example, the method can be used by interior designers, home stagers, or architects for their clients.

In a ninth example, the method can be employed within design games, such as games or experiences that simulate designing a room, the user's room, another user's room, or a generic room. For example, a user can design a room to meet a goal (e.g., three paintings on the walls of the room). In another example, the design may be scored (e.g., automatically according to how well the proposed virtual design satisfies interior design roles; crowdsourcing; or any other suitable scoring method).

In a tenth example, the method can be used for design recommendations (e.g., recommendations for virtual objects or virtual object poses). This can be automatically or manually determined based on: design rules or heuristics, pre-designed rooms with similar features (e.g., geometry, lighting, shadows, location, and other features), such as highly scored rooms; popular rooms; or any other suitable room. Walkthroughs, such as in virtual reality (VR) environments, are also possible, wherein successive portions of the image are successively rendered as the user virtually moves relative to the virtual room model. The virtual objects can be re-rendered with virtual user movement (e.g., to maintain perspective).

In an eleventh example, the methods can be used by artists and manufacturers to envision their products in user's homes.

However, the method can be otherwise used.

4. System

As shown in FIG. 1, the system for virtual interaction within rendered three-dimensional room imagery can include: a backend platform 110 and a front end application 122. The system can generate and/or be used with: room imagery, virtual objects (e.g., including a virtual object model and a virtual object visual representation), and virtual rooms (e.g., including a virtual room model and a virtual room visual representation). The system can optionally include: a remote capturing application 124, a SLAM engine 126, a visual representation engine 112, a room geometry engine(s) 114, a rendering engine(s) 116, a recommendation engine(s) 118. The system can optionally include: a virtual object repository, a capture data repository, a processed room model repository, a room imagery repository, a virtual room repository, and/or any other suitable data storage.

The system or portions thereof can be executed on one or more remote computing systems (e.g., servers, distributed computing systems), user devices 120, and/or other hardware.

The system can include one or more virtual objects. The virtual objects can represent existing objects within the room; new objects that are not physically located within the room; and/or other physical or virtual objects. Each virtual room can include one or more virtual objects, wherein the virtual objects can be separate, overlap, interconnect, or otherwise interact.

Each virtual object can be associated with associated object data. This object data can include: a virtual object visual representation (VOVR); a virtual object model (VOM); interaction modules; object attributes; a virtual object identifier; object auxiliary data; and/or any other suitable information.

The virtual object visual representation (VOVR) functions to visually represent the object. Examples of VOVRs that can be used include: a 2D image, a 3D visual model, a graphic, an icon, or other visual representation. In variants, the VOVR can optionally include environmental interactions (e.g., how light should be rendered on the object, reflectivity, etc.)

The virtual object model (VOM) functions to represent the geometry of the physical object corresponding to the virtual object. Examples of the VOM include: an object mask (e.g., 2D or 3D mask, a binary mask, bounding box, etc.), a surface mesh, a convex hull, and/or another geometric representation. An object mask can include two-dimensional and/or three-dimensional binary mask.

The object attributes function to define adjustable parameters for the object. Examples of object attributes include: object sizes, measurements, lengths, styles, colors, materials, woods, fabrics, optional accessories (e.g. handles, pulls, doors, legs), artwork frame and matte options, and/or other object attributes.

The virtual object identifier functions to identify the virtual or physical object. The virtual object identifier can be unique to the object (e.g., specific object attribute combination), or nonunique. Examples of virtual object identifiers that can be used include a SKU, database identifier, name, optical identifier, NFC identifier, Bluetooth identifier, or other identifier.

The object auxiliary data functions to identify auxiliary information associated with the virtual object, which may or may not be used by the user during system interaction. Examples of object auxiliary data include: the object author, description, style, price, vendor info, purchase link, or other data.

Figure 10A:
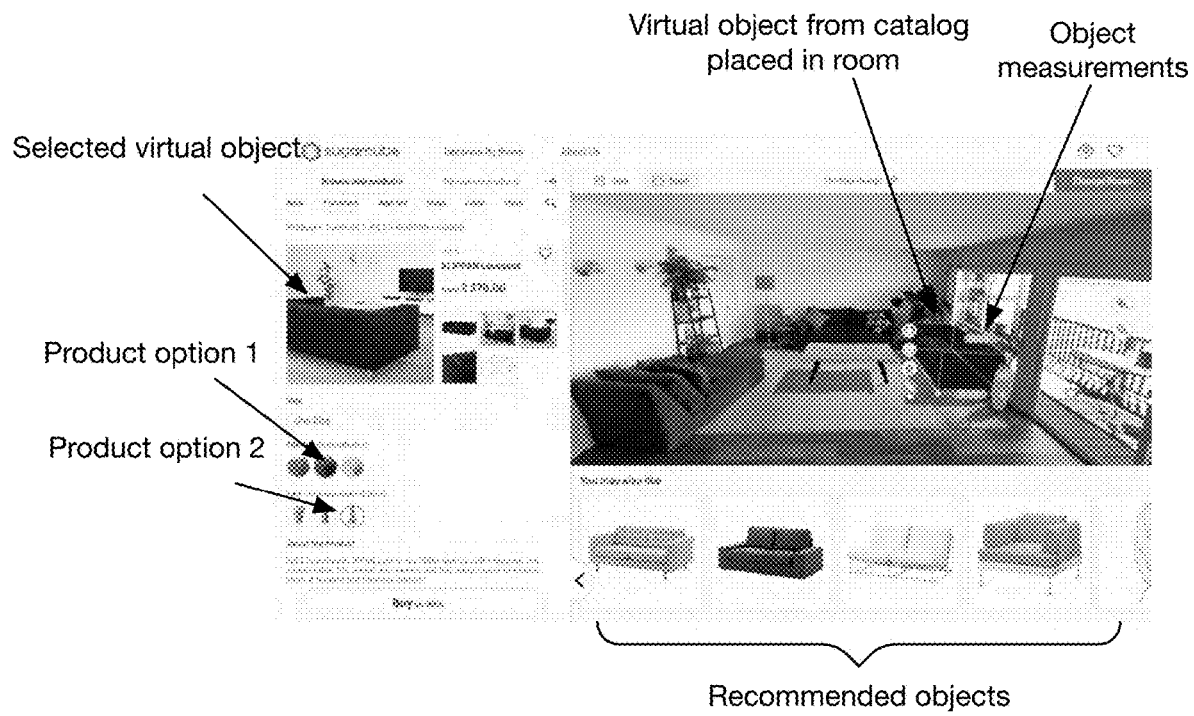
FIGS. 10A-10B depict embodiments of selecting the virtual objects and providing the final rendered room imagery on the frontend application.
Figure 10B:
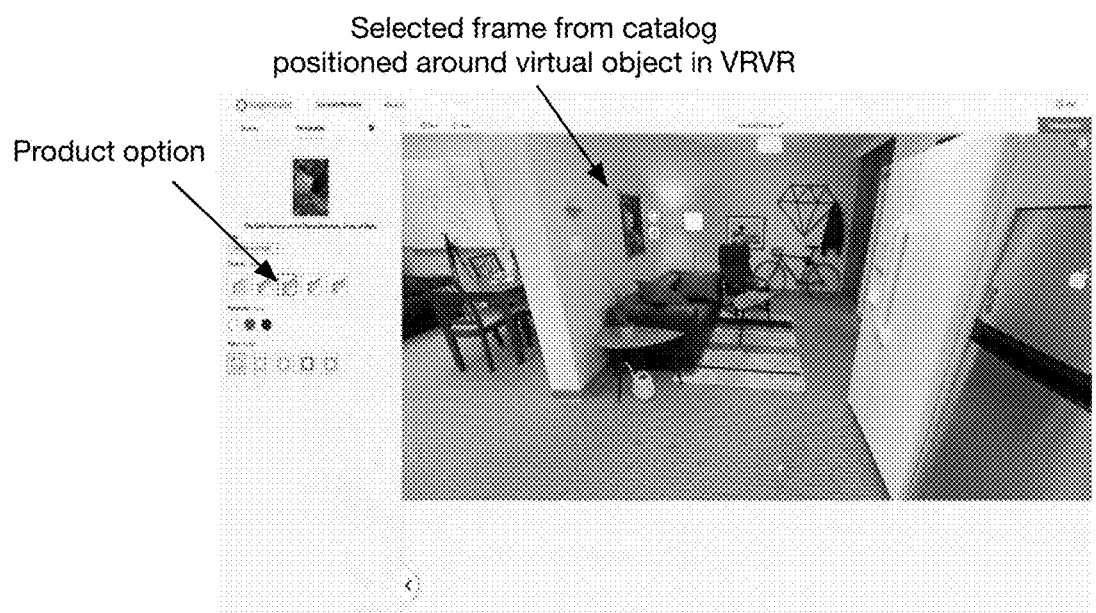

In some embodiments, the system can include a virtual object configurator, which functions to enable customization of the object attributes. The virtual object configurator can allow a user to select from and preview different product options, such as sizes, lengths, styles, colors, materials, woods, fabrics, optional accessories (e.g. handles, pulls, doors, legs), artwork frame and matte options, and/or other object attributes. The virtual object configurator can be: a dropdown menu (e.g., from the object, in a sidebar), a drag-and-drop interaction, a virtual assistant interaction, and/or include another interface. In a first example, as depicted in FIG. 10A, the selected product options can include color and accessory (e.g., sofa leg). In a second specific example, as depicted in FIG. 10B, the selected product option can include a wall art frame.

The virtual object can optionally be associated with one or more interaction modules that dictate how the virtual object interacts with other virtual objects. The interaction modules can include one or more: rule sets, heuristics, physics models, and/or other modules. The interaction modules can belong to the underlying object (existing object in the virtual room model), the new virtual object, all objects, and/or any other suitable object. The interaction modules can be for: a given surface, a set of object pixels or voxels, the entire object, an object component, and/or any other suitable object portion. The interaction modules can be: manually defined, automatically defined (e.g., trained using a set of videos or physics simulators), and/or otherwise defined. The interaction modules can be assigned to an object class (e.g., chair, table; furniture, lighting; etc.), a specific object, or otherwise determined. The interaction modules are preferably used by the rendering engine during updated visual representation rendering, but can additionally or alternatively be used by the front end (e.g., to determine whether a virtual object placement is valid) and/or otherwise used.

Examples of interaction modules include: placement rules (e.g., whether a given object class can be placed on the object surface; whether an object can be placed on the object surface); settling physics (e.g., draping, self-settling, etc.); and/or other physical interactions. In specific examples, the interaction modules dictate: the surface attributes that an object can be placed upon (e.g., wherein an object is permitted on vertical surfaces, horizontal surfaces, or both); height limitations (e.g., due to resultant object height on the pre-existing object vs. room height); component limitations (e.g., a table leg can be an impermissible area to place an object); draping physics (e.g., how a blanket drapes over a table or sofa; how a pillow settles, given the geometry of the sofa that the pillow is resting on; etc.); and/or other examples.

Virtual objects can be: generated (e.g., based on sampled images, geometry data, etc.); retrieved from the internet (e.g., online catalogs, social bookmarking services, social communities); retrieved from a database, such as a third party database or the user's own database; or otherwise determined. Examples of virtual objects can include: paint, furniture, flooring or floor coverings (such as rugs; flooring, such as wood, tile, or carpet; etc.), artwork (e.g., wall art), frames, lighting (e.g., lamps, recessed lighting, etc.), room décor (such as house plants, sculptures, vases, etc.), storage solutions (e.g., bins, baskets, containers, wall hangings, etc.), and/or any other suitable object. In one variation, the virtual objects are generated using: active methods (e.g., using rangefinders, structured light, etc.), passive methods, and/or other methods. Passive techniques can include: monocular cues methods, binocular stereo vision, stratification, stereo corresponding point base techniques, non-stereo corresponding contour methods, surface rendering techniques, and/or other passive reconstruction techniques. In some embodiments, virtual objects are processed to yield usable form (e.g. 2D images can be used as 3D artwork, wallpaper, pillows, fabrics, rugs, etc.; multiple photographs and/or room imagery of an object from different angles can be converted into a 3D model, etc.).

In use, the virtual object can be associated with a virtual object orientation and/or position (e.g., pose) within the virtual room model. The virtual object position and/or orientation can be: determined from the room imagery, automatically determined (e.g., based on rules, trained models, etc.), manually determined (e.g., received from a user), or otherwise determined. The virtual object orientation can be used to determine how to render the virtual object in the updated VRVR, determine which virtual object virtual representation to use within the updated VRVR, and/or otherwise used. The virtual object position (e.g., depth, lateral placement, and/or vertical placement) can be used to determine which parts of the virtual object and/or adjacent virtual objects to render into the updated VRVR. For example, the system can render pixels or segments of the virtual object(s) closest to a virtual camera (e.g., wherein the respective object masks can be projected into the virtual camera's frame of reference or coordinate system, and the mask segments associated with the closest proximity or shortest distances are rendered). The virtual object position can additionally or alternatively be used to determine: which virtual objects to highlight or overlay, how shadows are to be rendered with respect to virtual and physical objects, how virtual and physical light sources interact with virtual and physical objects, and/or otherwise used. However, the virtual object pose can be otherwise used.

Figure 2:
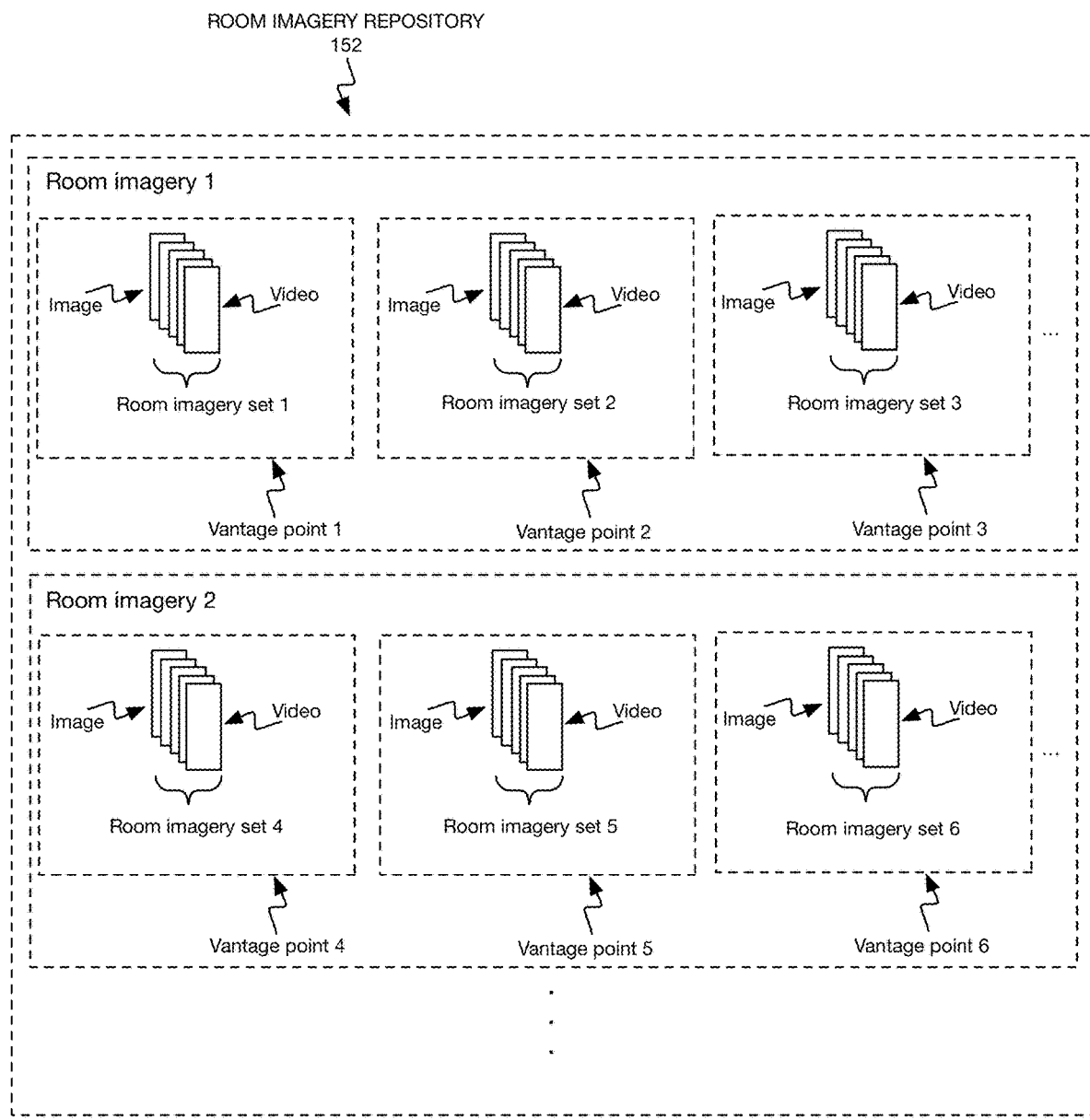
FIG. 2 is a schematic representation of an example of the room imagery repository.

The system can include room imagery, which functions to represent the visual appearance of a physical room (e.g., the scene; hereinafter equally applicable to descriptions applying to the room throughout this description). Examples of room imagery include: photographs (e.g., still images), video files, video frames or sequences, extended field of view (FOV) photos or videos (e.g., panoramas), RGBD depth images, synthetic data, and/or any other suitable visual media. The room imagery can be captured with diverse lenses and/or optics, captured with conventional lenses and/or optics, and/or captured with any other suitable lenses and/or optics. The room imagery can be captured by a camera (e.g., of a user device, such as a smartphone, tablet, etc.), video camera, and/or any other suitable capture device. The room imagery can be stored: onboard the capture device, at a remote computing system, at a room imagery repository (e.g., hosted by the remote computing system, capture device, etc.; example shown in FIG. 2), or otherwise stored.

In variants, the room imagery can be associated with capture data. The capture data can be sampled by the same or different capture device as that sampling the room imagery (e.g., the capture device, the viewing device, a remote capturing application 124, a secondary device, etc.). The capture data can be sampled concurrently, asynchronously, serially, and/or at another time relative to room imagery capture, virtual room interaction, or another process. Capture data can include: kinematic data, such as IMU data, gyroscope data, or other inertial sensor data; depth data (e.g., sampled by an RGBD depth camera, a SLAM engine, etc.); ambient environment data (e.g., ambient light intensity, color temperature, hue, etc.; temperature; etc.); timestamps; date; room pose (e.g., vantage point, orientation, room position, etc.); geolocation; capture device data (e.g., identifier, make and model, etc.); room identifier; and/or other auxiliary data. The capture data can be stored: onboard the capture device, at a remote computing system, at a capture data repository (e.g., hosted by the remote computing system, capture device, etc.); or otherwise stored.

In variants, the system can capture and use room imagery sets (e.g., set of images, one or more videos, set of video frames, etc.). Alternatively, the room imagery can be captured individually. The room imagery within a given room imagery set is preferably associated with the same capture data (e.g., vantage point), but can be associated with different capture data. A room imagery set can be related to other room imagery sets (e.g., share the same capture data; capture images of the same room; etc.), but can be unrelated or otherwise related. For example, a room imagery set can include multiple pieces of room imagery captured from the same position (e.g., vantage point) or similar positions (e.g., within a predetermined error threshold, such as 1 m, 2 m, 3 m, 4 m, etc.). Example positions include: in and/or near a doorway, in front of a window, in a corner, such as facing the room, along a wall, and/or any other position around the room. In another example, a room can be associated with multiple room imagery sets, each room imagery set associated with a different vantage point within the room.

The system can include one or more virtual rooms, which visually and geometrically represent a physical room (corresponding to the virtual room). The virtual rooms are preferably automatically generated by the system (e.g., based on the room imagery), but can be manually generated or otherwise generated. The virtual rooms can be stored by: the user device, the remote computing system, a virtual room repository (e.g., hosted by the user device, the remote computing system, etc.; example shown in FIG. 1), or other device. Each physical room can be associated with one or more virtual rooms (e.g., from the same or different vantage point).

The virtual room preferably includes: a virtual room model (room model, virtual model) and a virtual room visual representation (VRVR), but can additionally or alternatively include virtual object models (e.g., as described above), and/or other physical room representations. The virtual room and/or portions thereof is preferably portable, and can be interacted with in a physical space separate and distinct from the physical scene (e.g., room) that the virtual room represents, but can additionally or alternatively be fixed (e.g., to the physical scene).

The virtual room model functions to represent the physical room's geometry. The room models are preferably used to determine virtual object occlusions or physics (e.g., draping, resting, shadows, etc.), but can be otherwise used.

The virtual room model can represent: an empty room, a room with objects therein (e.g., represent the physical room with the existing objects), or any other suitable room. In a first example, the virtual room model describes the physical contours of the actual physical objects within the physical room. In a second example, the virtual room model preferably includes no added virtual objects, but only planar surfaces (such as walls, floors, and ceilings) and preexisting virtual objects, but can alternatively include only the planar surfaces of the room, only the planar surfaces and cavities in said planar surfaces (e.g., alcoves, built-in cabinetry, fireplaces, etc.), include a subset of the virtual objects, or include any other suitable set of features.

The virtual room model can include: depth maps, point clouds, surface meshes, a set of convex hulls, and/or any other geometric representation of a space. The room models can model all, a portion (e.g., only voxels or pixels within the field of view captured by the respective room imagery set), or any other suitable portion of the room. The virtual room models are preferably dense (e.g., include a measurement for every voxel or pixel; include a measurement for more than a threshold percentage of voxels or pixels, such as more than 50%, 60%, 70%, etc.), but can additionally or alternatively be sparse (e.g., include measurements for less than a threshold percentage of the total voxels or pixels), incomplete (e.g., include voxels or pixels with N/A, null, or infinite values), or otherwise constructed for the modeled portions of the room.

The virtual room model can include surface normal estimates (e.g., vectors) for: every pixel or voxel in the scene (or a subset thereof), identified planes, and/or any other suitable room feature.

The virtual room model is preferably scaled (e.g., metric scaled, scaled to US customary units, etc.), but can additionally or alternatively be unsealed. The virtual room model's scale can be automatically determined (e.g., based on heuristics, rules, building permits, etc.), manually determined (e.g., received from a user), inferred (e.g., from the known size of an object identified in the scene and the relative size of other room features relative to the object), or otherwise determined.

The virtual room model is preferably aligned with the respective VRVR, but can additionally or alternatively encompass a larger, smaller, or different field of view; be misaligned; or be otherwise related to the respective VRVR. The virtual room model and VRVR can be aligned using a shared reference point (e.g., the top left pixel), a shared reference feature (e.g., a wall seam), or any other suitable reference point. The reference point can be determined during virtual model generation (e.g., wherein the virtual room model is generated based on identification of wall seams or generated based on a per-pixel depth map or point cloud), automatically specified (e.g., based on feature uniqueness within the scene), manually specified (e.g. wherein the user interface can request that the user select a set of alignment points in the virtual model and the VRVR), and/or otherwise selected. The virtual room model can be modified or warped such that the room features, such as wall geometries and wall seams, match the virtual room model features (e.g., within a predetermined degree of error), or vice versa. Alternatively, the virtual room model and/or VRVR can remain unmodified or unwarped. However, the image and model can be otherwise aligned.

In variants, all or a portion of the room models can be associated with one or more physics models, which can model how virtual room (or portion thereof) interacts with virtual objects.

The virtual room can include planar surface representations of the physical room. Planar surfaces (e.g., floors, walls, etc.) can be represented by: object masks (e.g., planar object masks), surface masks (e.g., floor mask, wall mask, etc.), and/or otherwise represented, plane equations, surface normals (e.g., for a plane, for each of a set of pixels or voxels), boundaries and/or dimensions (e.g., planar segmentation or metric scale), planar surface pose (e.g., depth and/or orientation), and/or otherwise represented.

In a specific example, the existing foreground and/or background objects can be excluded entirely from the virtual model, treated as a virtual object and rendered at the user device onto the photorealistic image, or otherwise managed. Planar surfaces can be identified and masked as an uneditable region, optionally with an associated depth or label, e.g. "foreground" or "background".

In one variation, determining the planar surfaces can include: identifying and segmenting out the foreground and/or background objects (e.g., furniture, or cavities such as fireplaces or cabinets), such that the virtual model lacks the foreground and/or background object; and extrapolating the plane to the missing region previously covered by the foreground or background object in the associated photorealistic image. In a second variation, determining the planar surfaces can include: generating a point cloud and identifying planes based on the point cloud as the planar surfaces (e.g., associated with a predetermined set of semantic labels, such as "floor," "wall," or "ceiling"; planes at the room extrema; planes unassociated with objects; etc.). In a third variation, determining the planar surfaces can include: determining the planar surfaces from planar surface data received from a user (e.g., planar surface measurements, manual labels, manual bounding boxes, etc.). However, the planar surfaces can be otherwise determined.

The virtual room visual representation (VRVR) functions to represent the visual appearance of the room from one or more viewpoints (vantage points). The VRVR (e.g., immersive photo, interactive panorama, immersive panorama, etc.) is preferably presented to the user, but can be otherwise used. The VRVR is preferably re-rendered each time a virtual object is added or removed from the virtual room (or other room parameter is changed), but can additionally or alternatively be rendered once and remain static. The VRVR is preferably photorealistic, but can additionally or alternatively be immersive, not be photorealistic, or otherwise characterized. The VRVR can be static and/or dynamic (e.g., wherein a user can move between different vantage points, pan within a VRVR, zoom into a VRVR region, etc.). The VRVR preferably has an extended horizontal and/or vertical field of view (e.g., 90° or wider, 115° or wider, between 90° to 120°, a photo sphere, 360-degree photo, etc.), but can have another FOBV. The VRVR can be generated from the room imagery (e.g., with or without the capture data), the room model, or other data. The VRVR is preferably aligned with the respective room model, but can be otherwise aligned. Examples of VRVR can include: a single room image or multiple room images, with varying fields of view (FOV) (e.g., 57, 90, 180, 270, 280, 290, 300, 310, 320, 330, 340, 350, 360 degrees, etc.); panoramic images (wide and/or tall) represented as planar, cylindrical, or spherical projections (photo sphere), and/or an interactive panorama, an immersive panorama, or any other panorama; free viewpoint walk throughs; VR experiences; or other representations of the visual appearance of a space from one or more viewpoints.

The virtual room (e.g., the virtual room model) can include or exclude object masks. The object masks can represent: existing objects within the room (e.g., movable objects, non-fixtures), fixtures, and/or other physical components. The virtual room can optionally include permission masks that specify whether a user can interact with the masked region (e.g., interactable or uninteractable region), the interaction types permitted with the masked region (e.g., placeable or unplaceable region, hangable or unhangable region, etc.), and/or specify other permissions. For example, the interior of a fireplace can be associated with an uneditable region. In a second example, walls can be associated with a limited set of interactions (e.g., interact with hangable objects only).

The virtual room can optionally be associated with lighting information, which functions to define how the virtual room should be lit. Lighting information can include: light source poses (e.g., position, orientation, directions, etc.), light source spread (e.g., collimation, diffusion, etc.), light source color (e.g., hue, temperature, wavelength, saturation, lightness, etc.), light source intensity, light source type (e.g., natural, synthetic, etc.), light masks, shadow masks, highlight masks, and/or other information. The lighting information can be: automatically determined from the room imagery, manually specified, determined from virtual object lighting information (e.g., lighting information associated with a virtual lamp), and/or otherwise determined. The lighting information can be used by the rendering engine when rendering the updated virtual room virtual representation, or otherwise used.

The virtual room can optionally be associated with visual feature variables, such as image noise (e.g., for the associated photorealistic image), which can be determined from the room imagery, automatically generated, or otherwise determined.

The system can include one or more user accounts that function to identify a user and associated data. The user accounts can be associated with login credentials (e.g., username, password, API token, session key, etc.), room identifiers, virtual rooms, virtual objects, user preferences (e.g., style, colors, lighting, geography, etc.), interaction history (e.g., history of the virtual objects that the user has interacted with), and/or other data.

The system can include a backend platform 110. The platform can be implemented on a remote cloud-based server system, a distributed computing system, a local computing system, or any other suitable system. The platform functions to: determine the virtual room (e.g., virtual room model, VRVR, etc.), determine the object masks (e.g., for existing objects), render the updated VRVR, and/or perform other functionalities.

The system can include a front end application 122 that functions as the user interface. The front end application can execute on a native device, the user device, and/or another device. The front end application can include: a native application, a browser application, an SDK, an API plugin, or be otherwise configured. One or more of the engines and/or modules described herein can be executed by the front end application.

The front end application is preferably executed by a user device 120, which can function as a capture device, a display device, and/or perform any other suitable functionality. In examples, the user device 120 can: capture the room imagery, determine the virtual room, determine the virtual objects, display the virtual room, receive user inputs, determine updated virtual rooms, and/or perform other processes. The user device can be any device associated with or operated by a user. In various embodiments, the user device 120 include: a mobile device (e.g., a phone, tablet, smartwatch, mobile computer, etc.), a computer, a display (e.g., screen, touchscreen, projection, etc.), a wearable device (e.g., a heads up display, a headset, etc.), vendor or retail environments or devices (e.g., a furniture store or art gallery), a widget on a website (e.g., an embedded component within a website), a still frame camera, a video camera, or any other device that can be associated with or operated by a user.

In one variation, the front end application facilitates room imagery capture; however, the room imagery can be captured by a separate device and retrieved by the front end application, or be otherwise determined. For example, the front end application can include a capture user interface for capturing compatible room imagery. The capture user interface can include: capture instructions (e.g., phone movement patterns, user movement patterns, etc.), feedback (e.g., audio, visual, haptic, etc.), and/or other features. The capture user interface can capture: still images, video, auxiliary data, and/or any other suitable data associated with the room imagery (e.g., as discussed above).

In a second variation, the front end application receives user inputs to enable user interaction with the virtual room. In this variation, the front end application can include an interactive user interface (UI) that enables virtual object selection, placement (e.g., virtual object's 2D or 3D pose, position, and/or orientation selection), and/or manipulation (e.g., changing object attributes, such as size, style, etc.).

Figure 11:
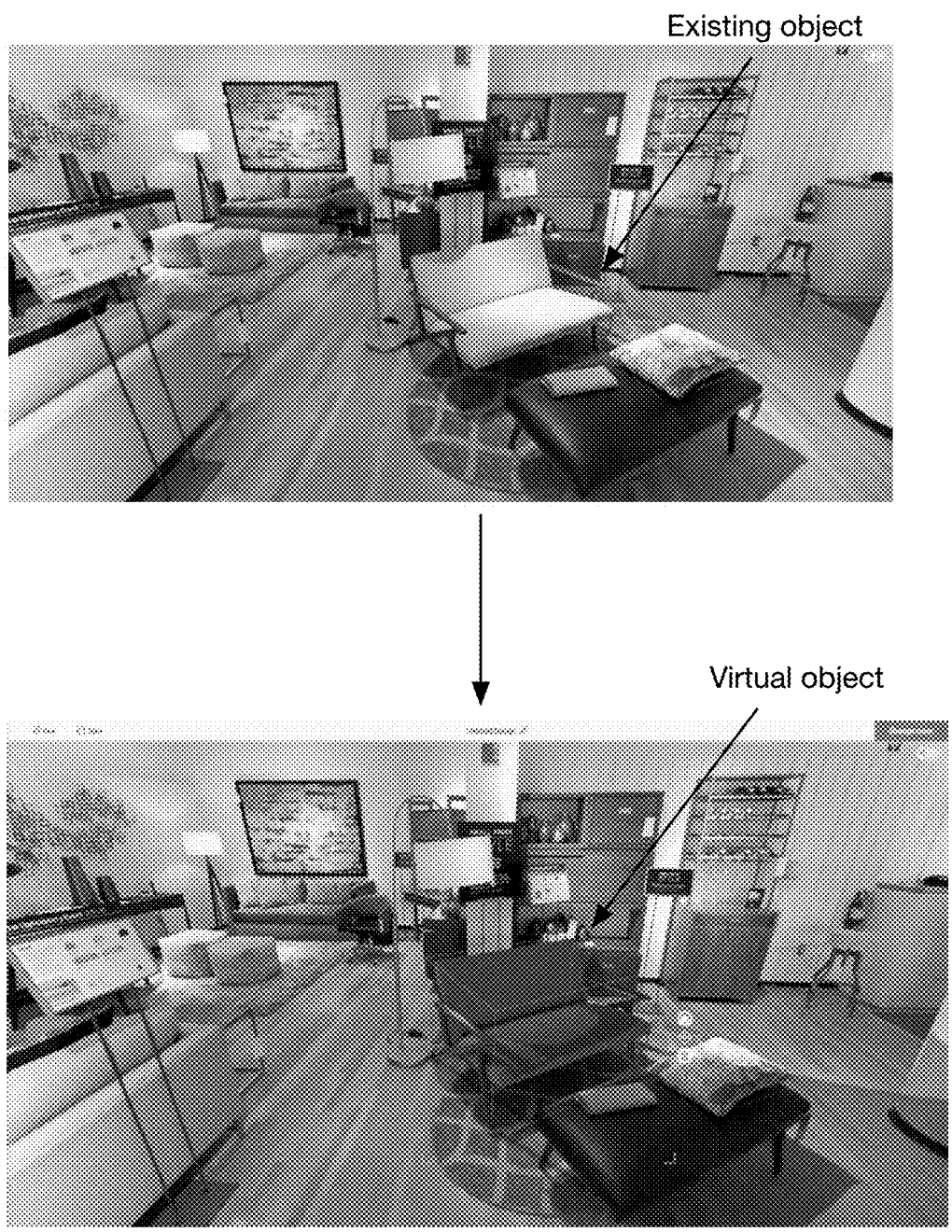
FIG. 11 depicts embodiments of replacing an existing object with a virtual object.

In a first example, the interactive user interface can allow the user to interact with physical objects visible in the scene, such as erasing a piece of furniture (to be replaced, example shown in FIG. 11), or repositioning a piece of existing furniture.

In a second example, the front-end application allows users to insert virtual objects into a static photographic image view of a room (preferably a wide field-of-view image). In a third example, the user can zoom, pan, and tilt within a static image to provide higher immersiveness. In a fourth example, the user can spin the viewpoint around a cylindrical view range (e.g. 180 degrees, 360 degrees, etc.), or within a hemispherical or spherical photosphere for even more immersiveness. In fourth example, the user can virtually move (e.g., "teleport") between a fixed set of positions in the scene to view and decorate a scene from different vantage points. In this example, virtual décor objects placed in the room from one vantage point will be visible and properly co-registered in 3D from other vantage points. In a fifth example, the model includes sufficient visual and geometric information such that the user can free navigate through the virtual space (e.g. in a "first-person walk-through" or virtual reality experience).

Figure 15:
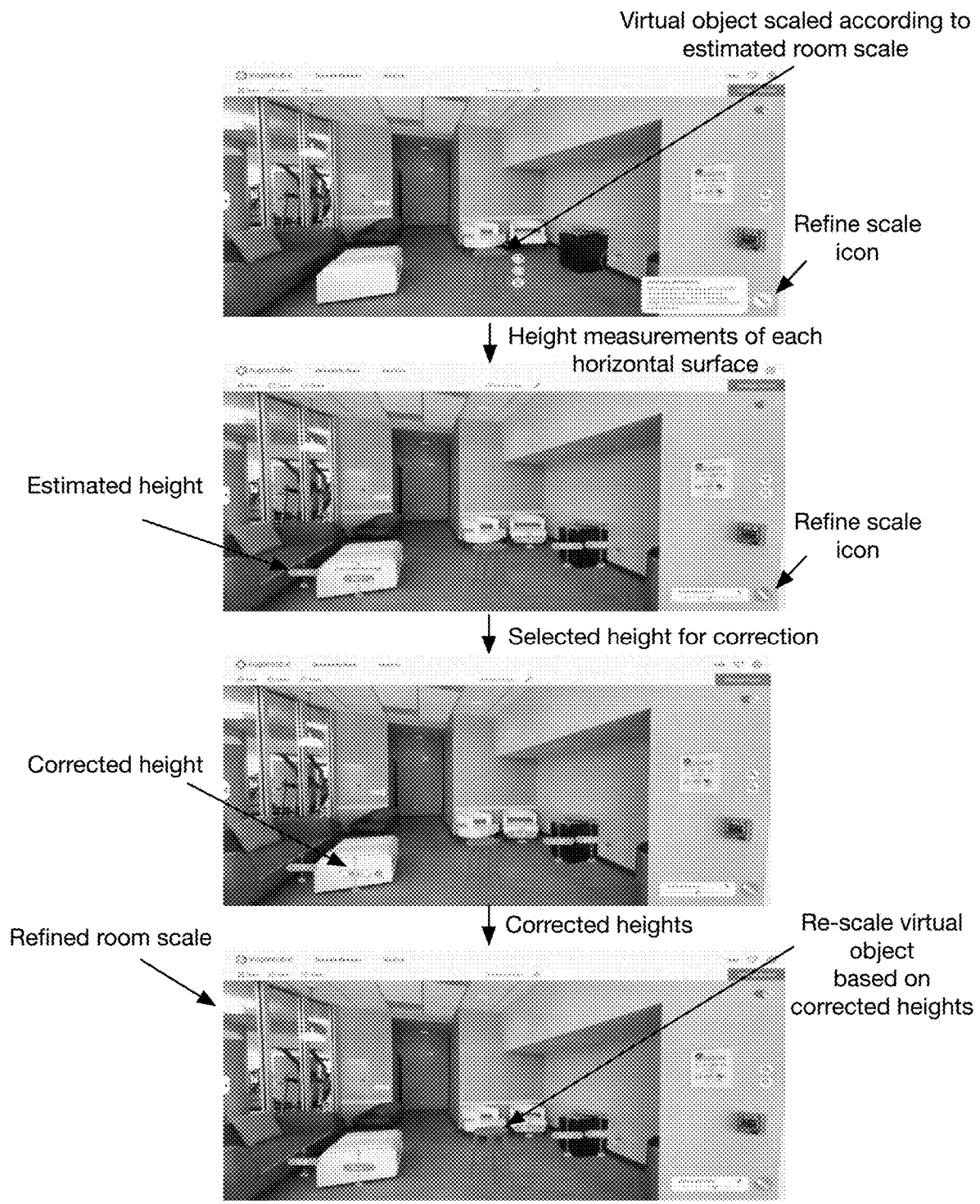
FIG. 15 depicts an embodiment of S700.

In a third variation, the front end application can allow the user to manipulate the geometry of the virtual room. For example, the interactive user interface can allow the user to adjust the global scale of the scene (e.g., global metric scale of the scene), which can fine-tune measurement accuracy, re-scale the room, or otherwise adjust the room geometry. Examples of adjusting the global scene scale include: inflating or deflating the size of the room, assigning a size of an existing object (e.g., wherein the room is resized based on the relative size of a known measurement in the virtual room, specific example shown in FIG. 15), assigning a size of a room feature (e.g., wall angles and distances, floor plan measures, elevation view heights), or otherwise adjusting the global scene scales. The global scene scale can be adjusted using a slider, a knob, two-finger touch (e.g., expansion or contraction), selecting an object or room feature and specifying a known measurement, or otherwise adjusted. A specific example of fine tuning measurement accuracy is depicted in FIG. 15.

In some embodiments, the user interface can render virtual objects onto the VRVR; alternatively, the backend system can render the virtual objects into the VRVR and send the updated VRVR to the front end for display. In a first example, the user interface only renders the virtual object(s) to be placed in the virtual room, wherein the rendered composition is displayed. In a second example, the user interface renders both the virtual room and the virtual object. However, the user interface can otherwise render the VRVR and/or virtual object.

One or more of the engines, algorithms, and/or modules described herein can be executed by the backend platform, the front end platform, and/or a combination thereof. In a specific example, all processes except for VRVR display and user interaction are executed by the backend platform, but can alternatively be executed by the front end application or combination thereof. In a second specific example, all processes except for VRVR updating, VRVR display, and user interaction are executed by the backend platform, but can alternatively be executed by the front end application or combination thereof. However, the system components and/or method processes can be otherwise distributed.

The system can optionally include a remote capturing algorithm 124. The remote capturing algorithm 124 functions to capture one or more room imagery (e.g., photographs, video, etc.) and/or capture data for the room imagery (e.g., extrinsic and/or intrinsic camera parameters). The remote capturing algorithm is preferably executed by the user device 120 (e.g., one or more processors of the user device), and is preferably stored by a computer readable medium (e.g., RAM, Flash, etc.) associated with the user device, but can be otherwise implemented. In some embodiments, the front end application 122 provides a user interface for capturing room imagery (e.g., images, video, etc.) of a room which are consistent and compatible with the methods herein.

The system can optionally use or include one or more SLAM engine(s) 126 (simultaneous localization and mapping engine). In various embodiments, the SLAM engine 126 can be part of: the front end application 122, the user device 120, the back end platform 110, the remote computing system, or otherwise stored and/or executed. The SLAM engine preferably constructs a map of an environment while simultaneously keeping track of an agent's (e.g., a camera's, a user device's, a capture device's, etc.) three-dimensional location and/or orientation direction within the capture environment (e.g., within the room, within the vantage point, etc.), but can additionally or alternatively have any other suitable set of functionalities. In some embodiments, the SLAM engine can output SLAM poses, SLAM features, and/or SLAM points.

The system can optionally include one or more visual representation engine(s) 112 that function to generate the VRVR from the room imagery (e.g., from one or more room imagery sets of the same room). The visual representation engine(s) 112 can include pano stitcher algorithm(s) (e.g., parallax-tolerant algorithms), rendering engines, and/or other modules capable of generating visual representations of the room.

Figure 3:
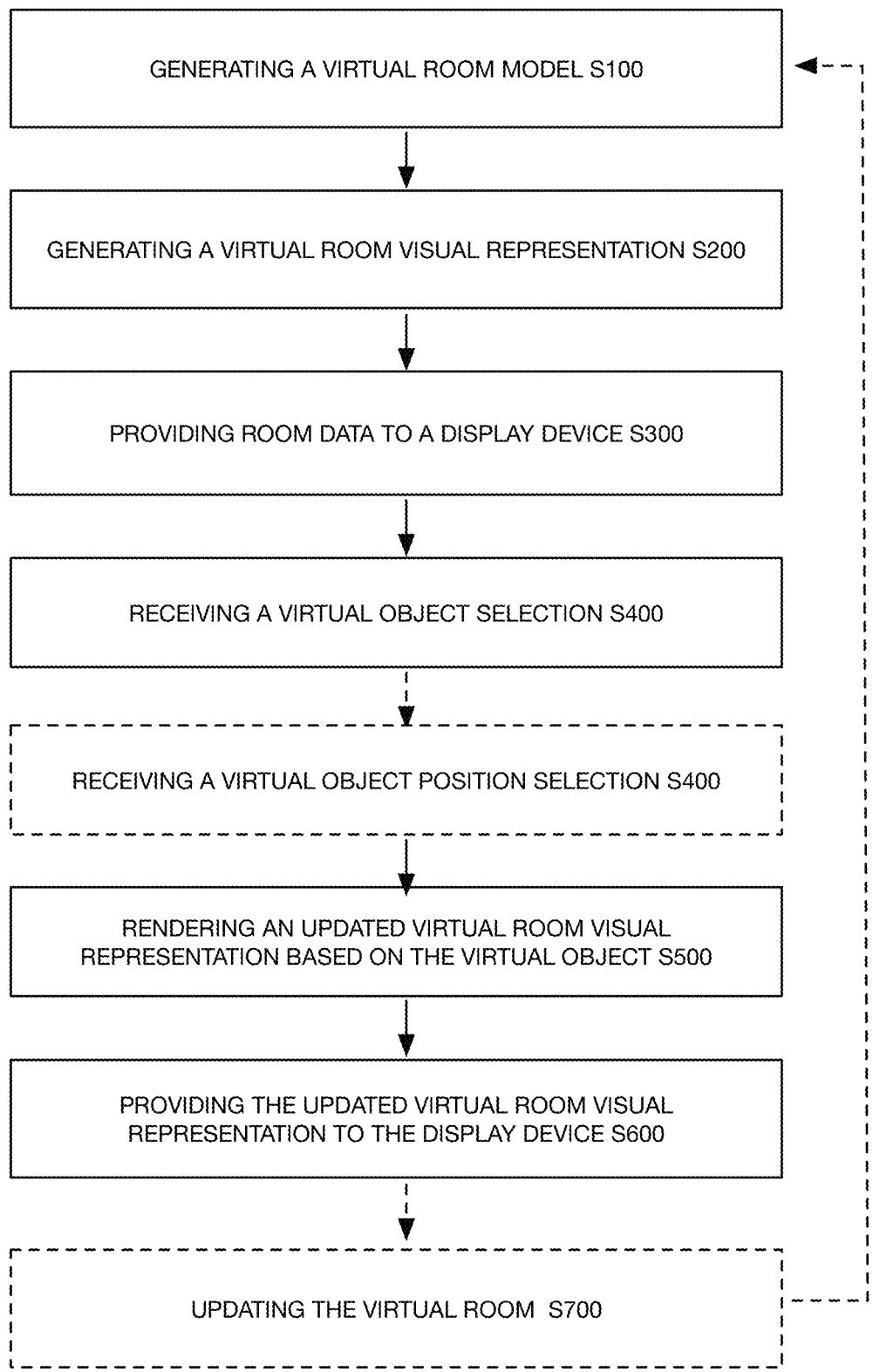
FIG. 3 is a flowchart representation of a variation of a method for virtual interaction with generated three-dimensional indoor room imagery.

The system optionally includes one or more room geometry engine(s) (114) or tools (example shown in FIG. 3) for determining and/or modifying virtual room data and/or associated capture data. Examples of virtual room data include: scale, measurements, relative sizing, perspective, and/or other attributes.

The system can optionally include, one or more rendering engine(s) 116 that function to render an updated VRVR (e.g., by simulating light transport, scattering, object physics, etc.). For example, the rendering engines can: render one or more virtual objects into the virtual room; render different lighting conditions (e.g. different time of day, an added or removed light sources, etc.); render a different paint or wallpaper; render different furniture fabrics; and/or render any other suitable update to the VRVR.

The rendering engine 116 can render the VRVR from: room imagery, the VRVR (e.g., original VRVR generated from the room imagery, without virtual object additions or removals, etc.), the virtual room model, the virtual objects (e.g., the virtual object models, VOVRs, etc.), and/or other data. The rendering engine 116 can be the same or different from the visual representation engine 112.

In a first variant, the system includes a single rendering engine. In a second variant, the system includes multiple rendering engines (executing in series or in parallel), wherein each rendering engine has a different accuracy and different processing time. Examples of rendering engines that can be used include the Pixar™ rendering engines (e.g., RenderMan, Mental ray), Houdini™, Blender™, and Autodesk 3 ds Max™, but any other suitable rendering engine (or calls to an external rendering engine) can be used.

For a given virtual room update, the system can render one or more VRVRs. In a first example, the system renders a single, highly accurate VRVR (e.g., with the single rendering engine or an ensemble thereof), wherein the user waits for VRVR rendering completion before viewing. In a specific example, the rendering engines can receive the virtual room model and all detected light sources, and can render the room imagery incrementally. In a first example, a first rendering can be based on the virtual room model and a subset of the detected light sources (e.g., the dominant light sources), and a second rendering can be based on the virtual room model and all of the light sources (e.g., minor light sources). In a second example, a first rendering can be based on a first light source and subsequent renderings can add light sources incrementally (e.g., a predetermined number of light sources for each rendering cycle).

In a second example, the system renders a series of VRVRs of the same updated virtual room (e.g., with serial outputs of the same rendering engine; from different rendering engines with different rendering accuracies and times, etc.), wherein each successive VRVR is more accurate (e.g., has more accurate shadows, incorporates more lighting or physics information, etc.) than the prior. In this example, the user can receive lower-quality VRVRs first (e.g., quickly), and incrementally receive and view higher and higher quality VRVRs over time.

In a specific example, the rendering engines can render the initial virtual room model and initial light sources (e.g., dominant, such as higher intensity) and the final rendering engines can render the room imagery based on the updated virtual room model and updated light sources (e.g., dominant or higher intensity; minor or lower intensity; etc.), and/or updated shadows. In some embodiments, a new light source can be detected by the backend platform, and the new light source can be rendered by the rendering engines (e.g., at the frontend application).

Figure 6:
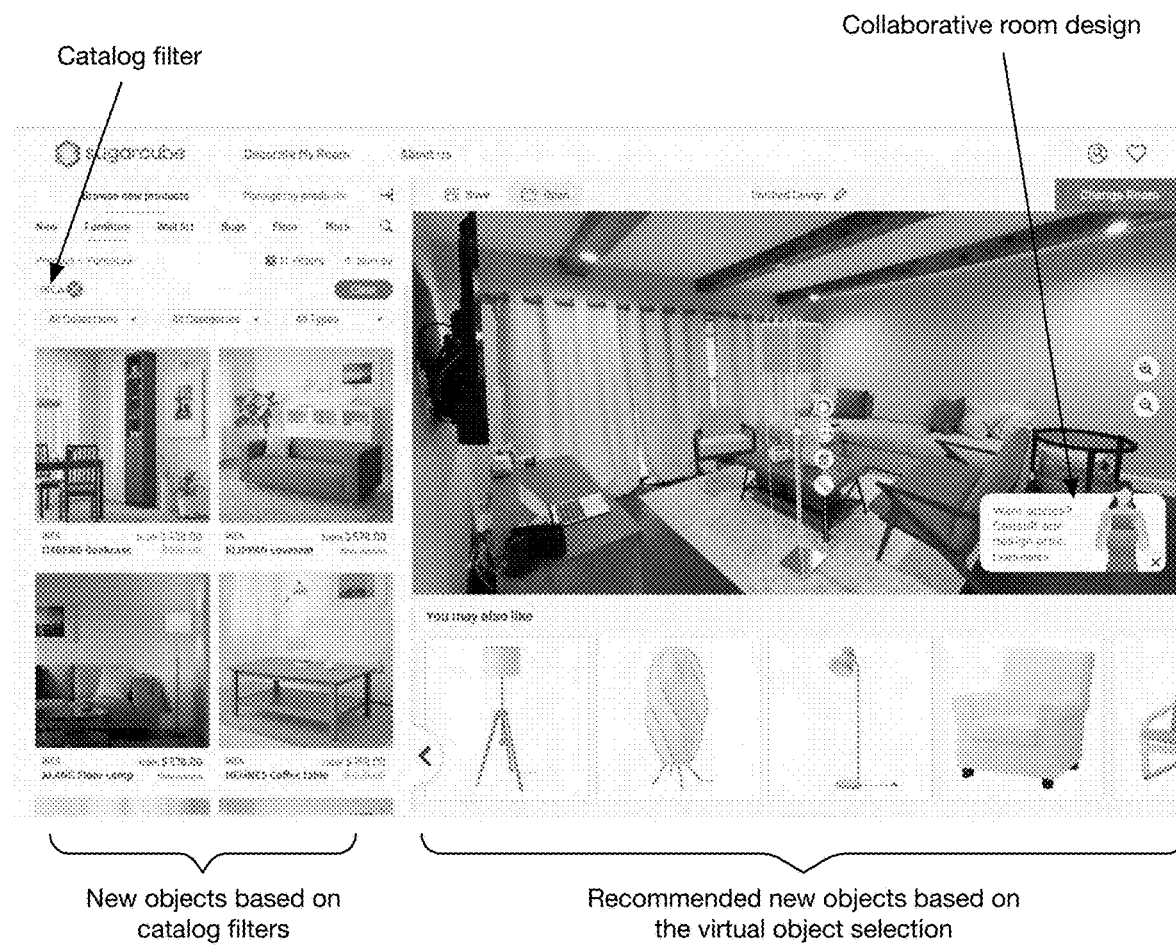
FIG. 6-7 depict examples of selecting objects on the front end application.

The system can optionally include one or more recommendation engine(s) 118 that functions to recommend objects (and optionally placement and/or attributes) for the room. In one example, the recommendation engine can "auto decorate" a room based on the recommended objects and recommended object positions. In one variation, each recommendation engine outputs a different parameter (e.g., object class, object position, object attributes, etc.). In a second example, each recommendation engine outputs a combination of object parameters. However, the object recommendations can be otherwise determined. The recommendation engines can include: heuristics, rule sets, neural networks (e.g., trained on professionally designed rooms, trained on prior retailer-designed rooms, trained on catalogs, etc.), and/or other analyses. The recommendation engine can generate the recommendations based on: the room geometry (e.g., from the virtual room model), the room's lighting (e.g., from the virtual room model), the room's color palette (e.g., extracted from the VRVR and/or room imagery), the room's existing furniture (e.g., from the virtual objects identified within the room), the room's inferred purpose (e.g., from the room's features and identified furniture), virtual objects placed within the virtual room; and/or other data. For example, the recommendation engine can recommend objects based on the virtual object selection and/or based on a memory of virtual object selections (e.g., stored in the virtual object repository), such as depicted in FIG. 6.

In some embodiments, the recommendation engine(s) 118 can include machine learning algorithms that can automatically recommend and/or automatically position recommended objects in the room. The machine learning algorithms can include: neural networks (e.g., DNN, CNN, RNN, etc.), Bayesian networks, clustering models, collaborative filtering, regressions, decision trees, and/or any other suitable algorithm.

4. Method

The method for virtual interaction with a three-dimensional indoor room includes: generating a virtual room model S100, generating a virtual room visual representation S200, providing the room data to a display device S300, receiving a virtual object selection S400, rendering an updated virtual room visual representation based on the virtual object S500, and providing the updated virtual room visual representation to the display device S600. The method can optionally include updating virtual room S700. The method functions to enable virtual interaction (e.g., decoration and/or placing of virtual objects) with three-dimensional indoor room imagery.

Generating a virtual room model S100 functions to determine physical room features. S100 can be performed in real- or near-real time (e.g., with room imagery capture), or be performed asynchronously. S100 can be performed by the room geometry engine(s) 114, but can be otherwise performed. Examples of physical room features that can be determined include: room geometry, object boundary segmentation), object identification, lighting, shadow, room style (e.g., theme), location and any other suitable room features. In some embodiments, the virtual room model provides one or more equations, algorithms, or other pieces of data that can be used to modify virtual objects to be placed within the scene of the virtual room. For example, the virtual room model can define the horizontal and/or vertical planar surfaces of the virtual room where virtual objects can be placed or hung; define dense depthmaps, surface meshes, and/or convex hulls describing the physical contours of actual physical objects currently present in the actual room, etc.); and/or define other room features. In some embodiments, the virtual room model can be generated from room imagery of the room, using 3D reconstruction methods, such as: multi-view stereo, structure-from-motion, monocular cues methods, such as shape-from-shading, photometric stereo, shape-from-texture, and/or any other suitable techniques. In some embodiments, the virtual room model can also be generated from surveying methods, such as projected light, time-of-flight sensors, LIDAR, manual measurements, and distance sensors. In some embodiments, the virtual room model can also be generated from architectural diagrams. In some embodiments, the virtual room model can be generated using the method disclosed in U.S. application Ser. No. 16/823,123 filed 18 Mar. 2020 titled "VIRTUAL MODELING OF INDOOR SPACES FROM IMAGERY" and claiming priority to U.S. Application No. 62/819,817 filed 18 Mar. 2019, each of which incorporated herein in its entirety by this reference.

In some embodiments, the virtual room model can be used to automatically generate floorplans (e.g., top down view of the room), elevation diagrams, full CAD models, and/or any other suitable diagram or model. In one example, conventional methods for generating different views of a model can be used. In a second example, the virtual room model can be projected into a virtual camera from the desired view point.

Generating a virtual room visual representation (VRVR) S200 functions to generate one or more photorealistic visual representations of the physical room. This can create larger field-of-view immersive images that better mimic the sense of the human visual field.

The VRVR of the room can be generated for: a specific room, a position within the room, a pose within the room, and/or another location. The VRVR can be generated automatically, manually, from the room imagery, and/or otherwise generated.

The VRVR can be generated before a virtual model of the room is generated; during the virtual room model generation process; after a virtual room model is generated; using a combination of the above; or at any suitable point in the method. In some embodiments, the VRVR is used as inputs for one or more elements in order to generate the virtual room model.

S200 is preferably performed using the room imagery (e.g., one or more room imagery sets associated with the room, room position, etc.), associated data (e.g., capture data, 3D SLAM points), prior VRVRs of the same room, and/or the virtual room model, but can additionally or alternatively be generated based on user inputs and/or other inputs. For example, S200 can "stitch" multiple images together into a seamless wide-angle photograph (e.g., the VRVR). This immersive image formation can be done statically (e.g. providing a single fixed view) or dynamically (allowing the user some degree of mobility within a space). S200 can be performed by the visual representation engine, or by any other suitable system.

S200 can generate the VRVR using 3D-aware stitching (e.g., using the processed room imagery and capture data with improved accuracy), panoramic methods, and/or other methods.

In a first variation, S200 can include using one or more pano stitching algorithms. For example, the system can use pano stitching algorithms (e.g., parallax-tolerant algorithms) to generate one or more complete VRVRs, using the received improved 3D data and the received room imagery.

In a specific example, a parallax-tolerant algorithm takes indoor rotation-prone room imagery and accounts for the rotation of objects, which can optionally include local stitching, (e.g., aligning images, such that there is a local region where the images can be seamlessly blended together, such as using homography and content-preserving warping).

The pano stitching algorithm can optionally align features. In a first embodiment, the algorithm can robustly handle coarse alignment by using camera pose estimates from camera IMU, SLAM, or SFM to coarsely align images. In a second embodiment, the algorithm can include content-preserving local mesh warping that locally aligns images to prevent small defects, while preserving the integrity of global features (e.g. long, straight lines). In a third embodiment, optical flow and/or direct photometric alignment can be used to pull pixels into alignment while minimizing a loss function. In a fourth embodiment, the algorithm can use known 3D features and correspondences to reduce 3D geometric error in images. In a fifth embodiment, the algorithm can use estimated camera poses and epipolar geometry to composite multiple images while choosing source pixels with minimal 3D error. In a sixth embodiment, when the user's capture motion is dominantly in one direction, the algorithm can use slit scan compositing techniques to minimize alignment error. In a seventh embodiment, when sufficiently high quality pixel depth information is available, the algorithm can use novel-view synthesis techniques to allow viewpoint variation. In an eighth embodiment, the system can use locally adapted global alignment models such as adaptive as-natural-as-possible or as-projective-as-possible image stitching to align the images. However, any other suitable parallax tolerant image stitching method can be used.

In some embodiments, the stitching is two-dimensional and not 3D-aware in initial pano stitching.

In some embodiments, the stitching is three-dimensional, permitting bundle adjustment and depth estimation.

In some embodiments, the system can use feature correspondences from SLAM, structure from motion (SfM), multi-view stereo (MVS), optical flow, or neural networks to bring images into alignment.

In some embodiments, the system can use sparse or dense depth maps from active depth sensors to bring images into alignment.

In some embodiments, the system performs enhancement processing of the room imagery, (e.g., based on lighting features, such as dominant light directions, and/or secondary light directions from real objects, natural light, virtual objects, image noise, etc.) Examples can include denoising, HDR, exposure compensation, histogram equalization, and other enhancement processing methods.

Figure 4A:
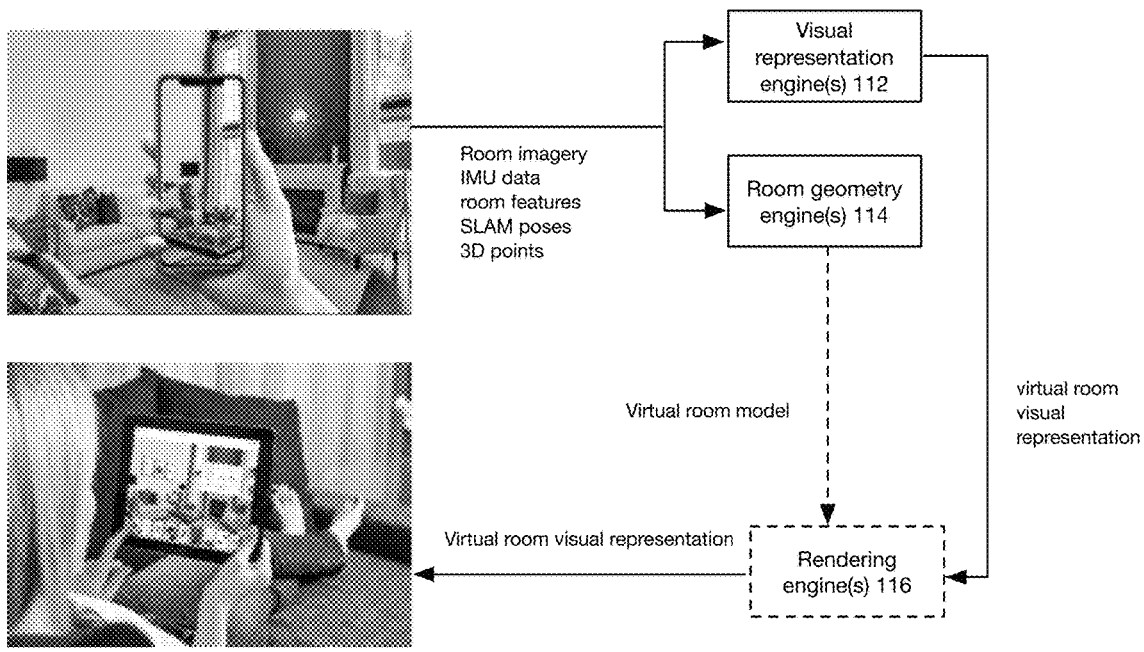
FIGS. 4A and 4B are schematic representations of examples of the system and data flow between them.

The method can optionally include receiving and/or capturing room imagery, wherein the room imagery can be used to determine the virtual room model and/or VRVR (example shown in FIG. 4A). This enables a user to capture, model, and virtually interact with his or her own physical space. The room imagery is preferably captured by the remote capturing application 124, but can be captured by any other suitable system. The room imagery and any associated data is preferably sent to the remote computing system for further processing after capture, but can be locally processed or otherwise processed. The room imagery is preferably captured in one or more sets, but can be otherwise captured. Capturing room imagery can include: capturing a predetermined number of still images, capturing video (e.g., during capture device motion), capturing image bursts, capturing depth data, and/or capturing any other suitable visual media. Capturing room imagery can include: instructing the user to move the capture device in a predetermined pattern, a random pattern, within a predetermined physical volume, and/or any other suitable instruction.

In a specific example, the application guides a user to take five photos, rotating the camera from one standing position, moving to another standing position, following the same process again with five photos, and repeating the process until occurrence of an end event (e.g., a sufficient number of images is captured, a predetermined collective FOV of the room has been captured, etc.). In another example, the application guides a user in the UI to keep the horizon level and encourage a proper degree of image overlap, by asking the user to rotate a cursor along a horizontal line to line up targets a designated number of times, e.g. three times, five times, or any other number of times. For example, the system can guide the user to limit side-to-side camera movement to avoid parallax movement (e.g., objects rotating side-to-side depending on their distance from the camera).

The method can optionally include sampling capture data. The capture data is preferably sampled with the room imagery (e.g., concurrently captured), but can be sampled at any other suitable time. The capture data is preferably captured by the same capture device as that capturing the room imagery, but can additionally or alternatively be captured by a secondary capture device. In some embodiments, sensor and accelerometer data of the device is captured with the room imagery (e.g., photos, video, etc.).

Providing room data to a display device S300 (example shown in FIG. 5) functions to provide an interactive photorealistic interface that the user can interact with.

The room data can include the virtual room visual representation, and can optionally include the virtual room model, the virtual objects, lighting information (e.g., highlight masks, light sources, etc.), masks (e.g., warping masks, hangable region masks, foreground masks, lighting or shadow masks, etc.) and/or other data. In a first example, the VRVR can be provided without additional data, wherein the VRVR is completely rendered by the backend. In a second example, the VRVR can be provided with the lighting information, wherein the display device renders the lighting within the incomplete VRVR. In a third example, the VRVR can be provided with one or more virtual objects (e.g., object masks) for editable objects. However, any other suitable room data can be provided.

S300 can be performed: in response to room imagery receipt, upon entry into a predetermined geofence (e.g., retailer's geofence), in response to receipt of a request for the virtual room (e.g., with the virtual room identifier), when the native application is launched, in response to determination that the user has selected an object (e.g., by taking a photo of an object), or at any suitable time.

S300 can include: sending the room data to the display device, and presenting the VRVR at the display device (e.g., by the front end application). The room data can be sent from the remote computing system, an intermediary device (e.g., a relay, a secondary user device), or any other suitable source device.

The room data can be sent: incrementally, concurrently, or in any suitable order. In a first variation, only high-quality room data (e.g., above a threshold resolution, above a threshold accuracy, etc.) can be sent to and displayed by the display device. In a second variation, incrementally higher quality room data (e.g., wherein each successive room data has higher resolution and/or accuracy than the prior data) can be sent to and displayed by the display device. In an example of this variation, incrementally higher quality VRVR renderings can be sent to the display device for display as higher quality VRVRs are generated (e.g., with higher quality and/or accuracy shadows, etc.). In a specific example, an initial VRVR rendered using the dominant light sources (e.g., the highest intensity light sources) can be sent to the display device for display. While the initial VRVR is being displayed and interacted with, higher accuracy VRVRs can be generated based on subsidiary light sources (e.g., lower intensity light sources) and subsequently provided to the display device when ready. In a third variation, different functionalities can be successively enabled as the room data quality satisfies the functionalities' requirements. However, the VRVR can be otherwise provided to the display device.

Functionalities can additionally or alternatively be slowly activated (e.g., as they become available, as the VRVR quality meets the functionality quality requirement, etc.). For example, virtual object selection and positioning can be activated before lighting intensity adjustment.

Figure 4B:
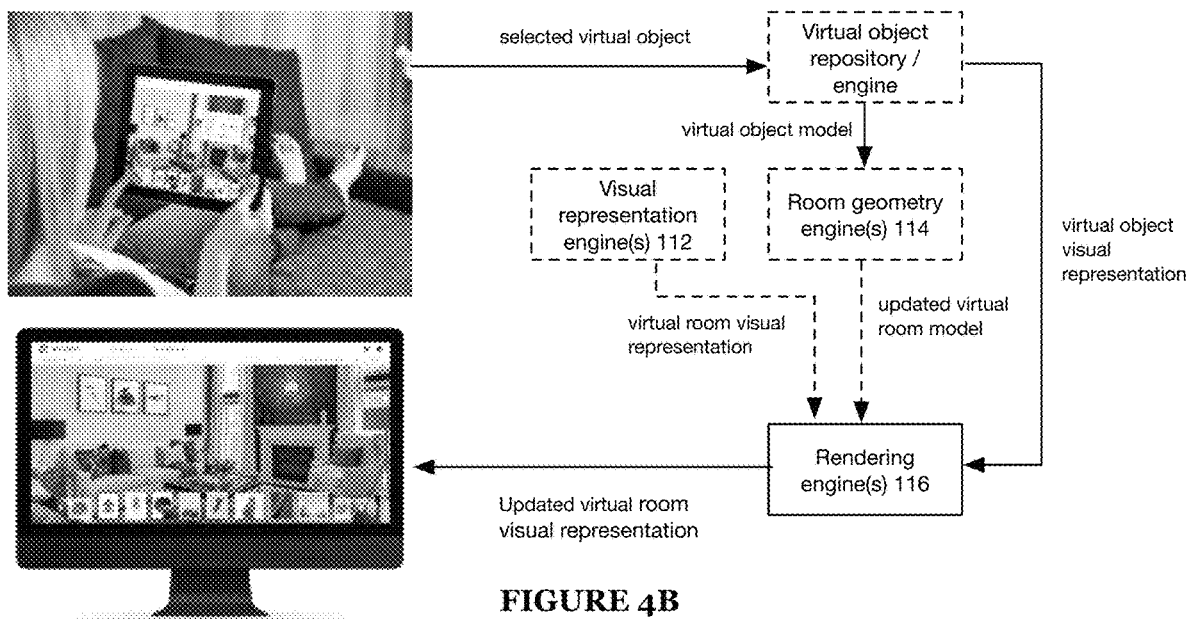
Figure 5:
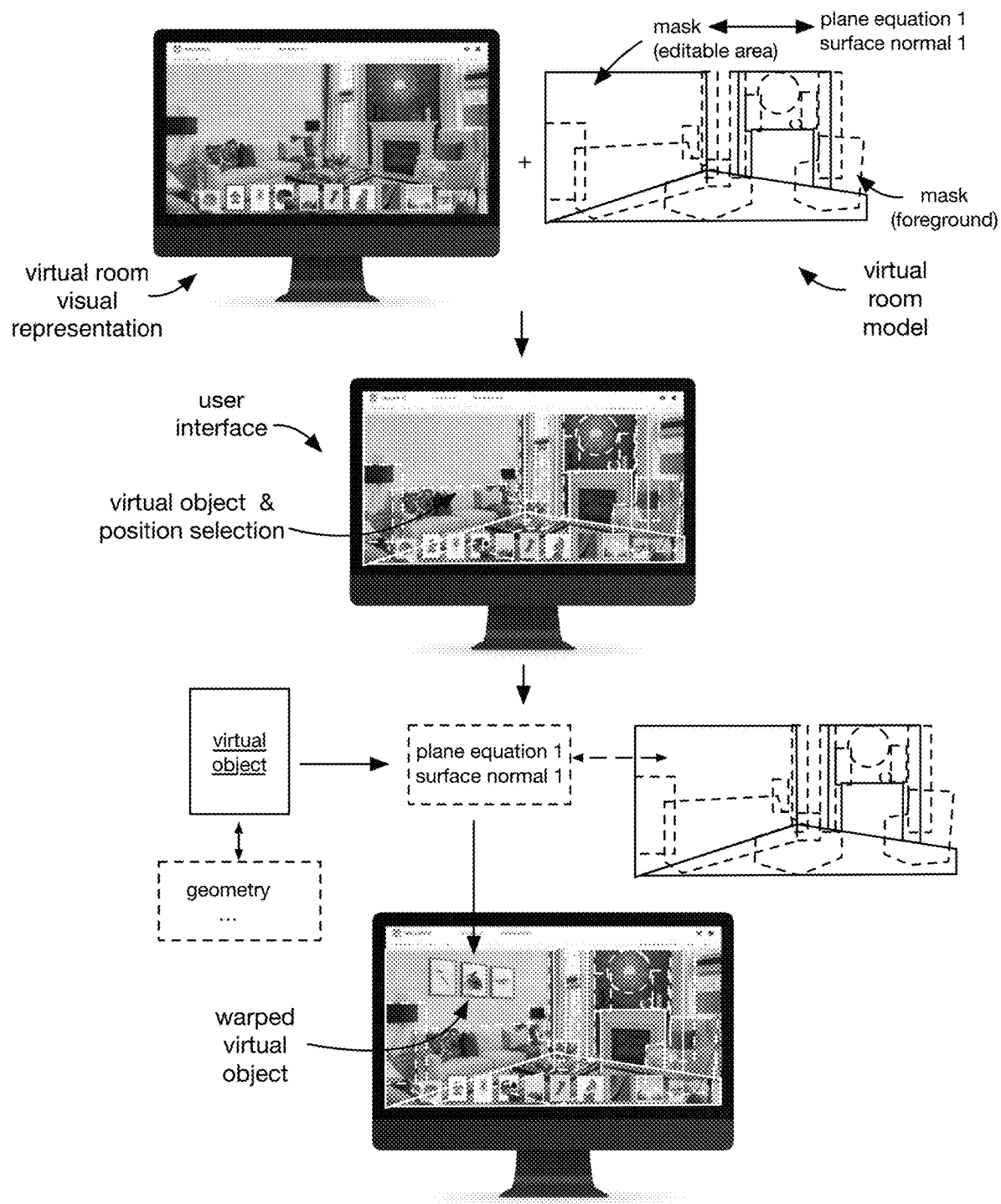
FIG. 5 is a schematic representation of an example of dynamic virtual object rendering onto the room imagery, based on the virtual model.

Receiving a virtual object selection S400, functions to identify a virtual object to model with the virtual room (e.g., specific examples of which shown in FIG. 4B and FIG. 5). The virtual object can be selected: by a user (e.g., room owner, collaborator, etc.), by an automated system, and/or otherwise selected.

In one embodiment, the system provides a user interface to select one or more objects from a list of objects for selection. In some embodiments, the objects can be selected based on one or more of: size, style, author, description, price, vendor info, or any other suitable selection criteria. In some embodiments, the user can select product options if applicable, such as frame style for art work, wood species for furniture, fabric type, fabric color, size, dimensions, material, and/or other object attributes.

Figure 7:
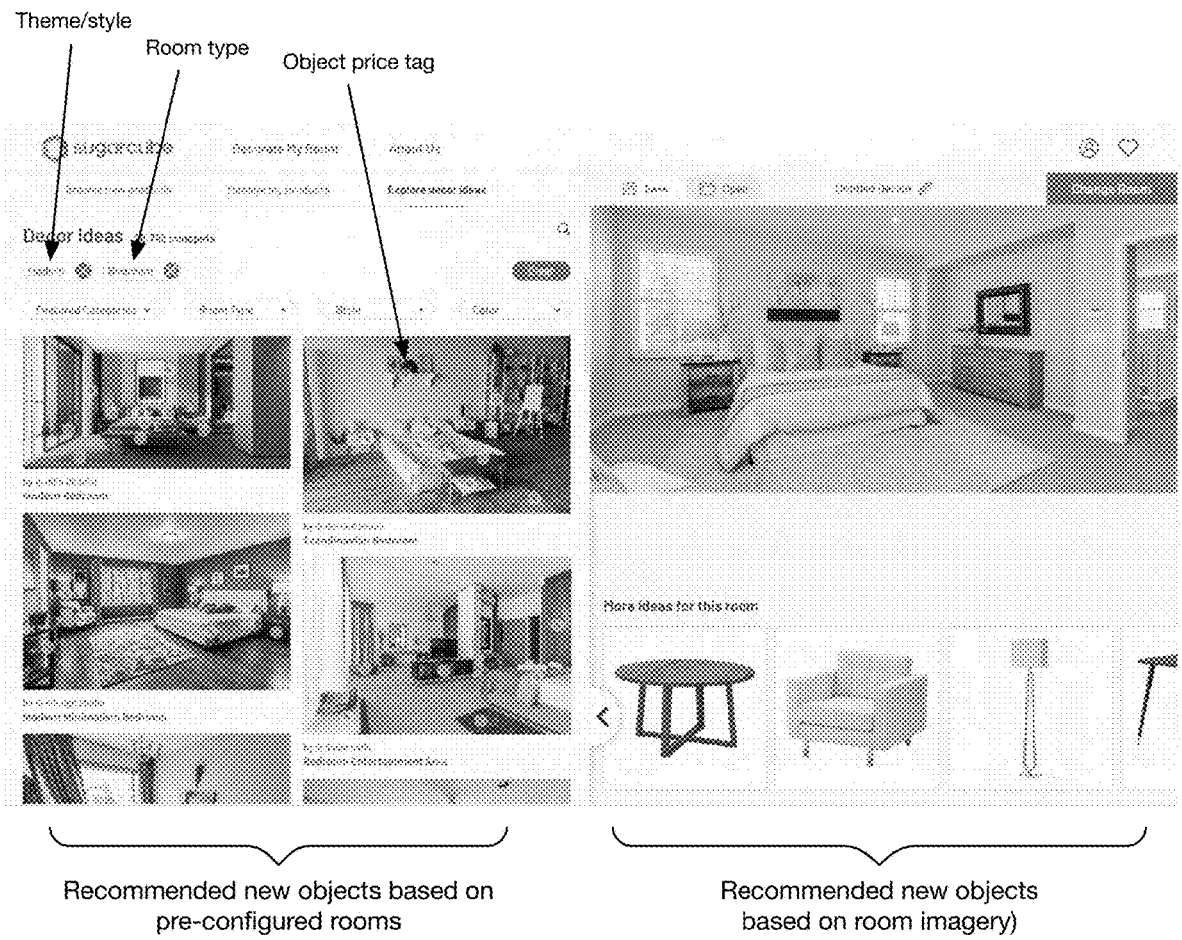

Objects can be selected from a first party website, from one or more third party websites, social bookmarking sites, advertisements, and/or from any other suitable source. In some embodiments, the objects can be pulled in using one or more bulk API calls that bring in a catalog of objects from one or more sources. In some embodiments, the objects can be imported (e.g., into the front-end application) from a user library, social media sites, or other sources for importing. In some embodiments, as depicted in FIG. 7, the user can impose object filters on the catalog to reduce the search space. The filters can include: company, theme/style, room type, product type, and/or any other suitable filter.

The virtual object can be dragged-and-dropped, imported from an image taken by the user (e.g., on the same or different device as that used for viewing), determined based on geometry scanned by the user (e.g., using photogrammetric 3D scanning, etc.), retrieved based on a received identifier (e.g., a scanned optical identifier, such as a QR code, barcode, price tag, electronic product identifier, stock keeping unit (SKU), etc.; a short range identifier, such as a NFC tag, Bluetooth identifier, or RFID tag; etc.), or otherwise selected.

Figure 8:
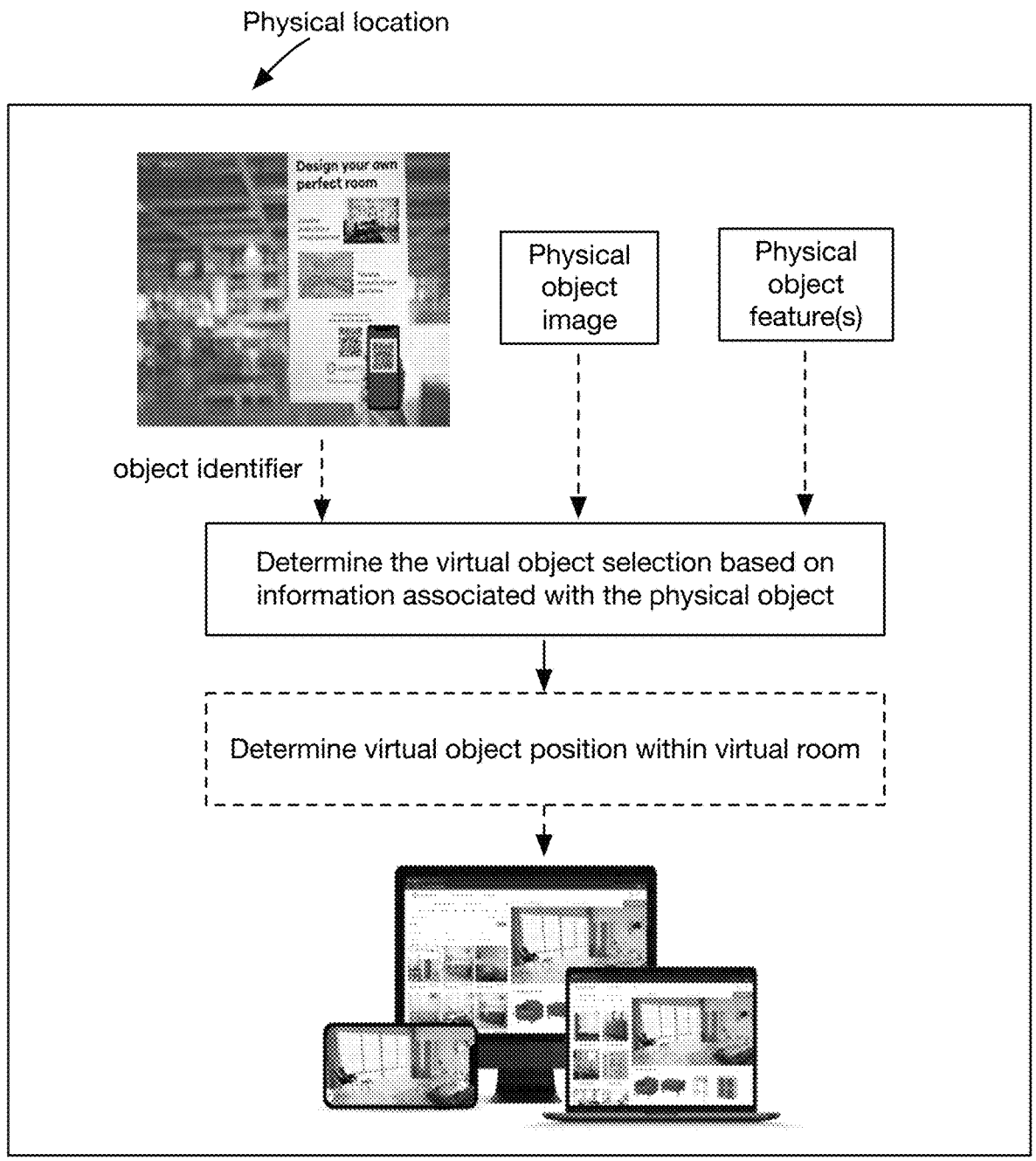
FIG. 8 depicts embodiments of selecting virtual objects wherein the user is at a physical location.

An example of finding objects from foraging in the real world is depicted in FIG. 8, wherein a physical object at a physical location is used to determine a corresponding virtual object based on an image of the object.

In a first variant, S400 can include capturing an image of the object using the user device; extracting object features (e.g., text description, style and/or theme, measurements, fabric, type, material, visual identifier, etc.) associated with the object depicted in the image; performing a search within a database based on the object features (e.g., in the catalog on the front end application, in a browser, on the internet, etc.); and selecting the virtual object identified by the extracted object features.

In a second variant, selection can include matching the object features and/or the object image to a similar (recommended) object (e.g., similar dimensions, such as less than 3 cm, less than 5 cm, less than 10 cm; similar style and/or theme, such as based on a categorial classification; similar product, such as based on the product type, etc.), wherein the similar object is associated with a predetermined virtual object, which can be used in lieu of the physical object.

In a third variant, when the image search does not yield a 3D model, the selection can include approximating a 3D model based on images captured by the user and/or additional images of the object, such as those obtained from the image search; and determining an object mask for rendering the object in the scene.

Figure 9A:
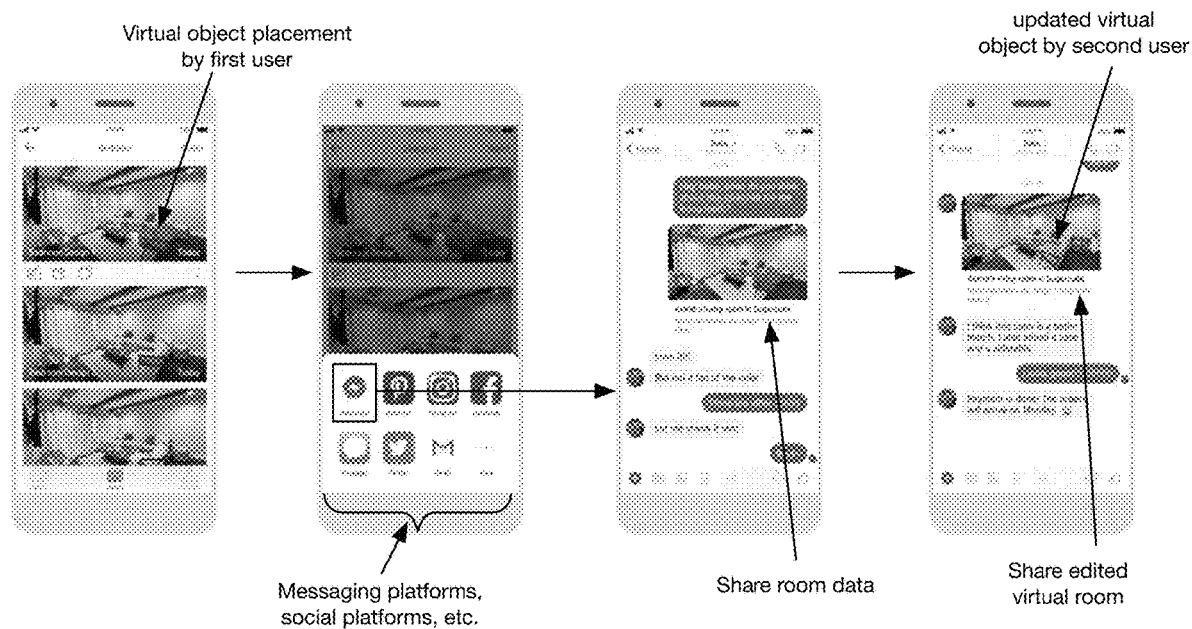
FIGS. 9A-9B depict embodiments of selecting virtual objects based on collaboration on social platforms.
Figure 9B:
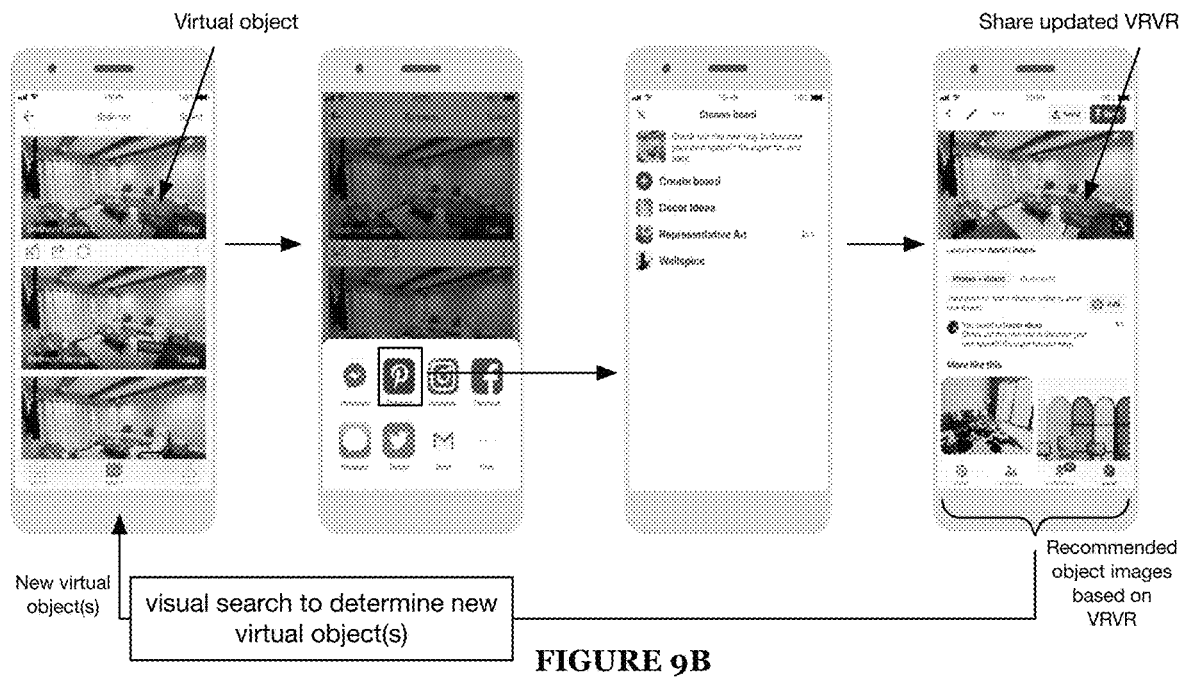

In some embodiments, the selection includes selecting objects by a second user, distinct from the first user. The second user can be a professional designer, a partner, a friend, and/or any other suitable user or automated user, such as depicted in FIG. 6. In one variant, the second user can access the scene from a second user account, wherein the first user enabled access for the second user account to access the VRVR. In a second variant, the user can send the virtual room (e.g., the VRVR, the virtual room model, the object masks, etc.) to a second user account using a messaging platform and/or service, as depicted in FIG. 9A. In a third variant, the user can upload the virtual room to a social platform (e.g., Instagram, Pinterest, Facebook, twitter, and/or any other social platform) and the additional users with access to the user's content (e.g., that are "friends" of the user) can access the virtual room and select virtual objects. In a fourth variant, as shown in FIG. 9B, the user can upload the virtual room to a social platform, and the social platform can determine object advertisements and/or recommendations to the user based on the virtual room. The object advertisements and/or recommendations can be used to determine object masks (e.g., using a visual search), such as to import the virtual objects into the virtual room model and/or room imagery.

In some embodiments, the selection includes automatically selecting objects. Objects can be automatically selected based on no prior knowledge, based on existing objects in the room, based on product offerings that are contextually relevant to the room being decorated, based on user selected pre-configured room images (e.g., inspiring pictures with furnishings that can quickly be tried in the user's room), based on room features (e.g., style, color palette, etc.), and/or other information.

In some embodiments, selection can include selecting objects from the front-end application, such as from a set of suggested objects presented to the user (e.g., from a catalog), as depicted in FIGS. 6-7. The suggested objects can be based on a set of automatically selected objects, based on objects from pre-designed rooms (e.g., show rooms), based on objects from an object key word search, and/or any other suitable objects.

In some embodiments, the selection can include receiving a unique identifier (e.g., such as a QR code, barcode, price tag, electronic product identifier, stock keeping unit (SKU), etc.); and retrieving a virtual object based on the unique identifier.

In some embodiments, the selection includes receiving a screen shot of an advertisement campaign and/or social media feed and accessing the virtual object associated with the advertised product.

In some embodiments, the selection includes receiving an image from the user device (e.g., of an object in a printed form, such as a magazine, catalog; a digital form website, social media, advertisement; and/or a physical form, such as in a store location, residence, office, etc.); identifying an object and associated unique features using a visual search (e.g., example shown in FIG. 11; wherein a real object can be identified using the visual search, and replaced with virtual alternatives of the same or similar object); matching one or more unique features to a virtual object; and importing the virtual object into the virtual room.

In a first variant, the selection includes receiving an image and automatically recognizing the object depicted in the image from a library of objects, such as stored in the virtual object repository.

In a second variant, the selection includes scanning a full 3D model of an arbitrary object using SfM, MVS, and/or any other photogrammetry technique.

The selection can optionally include receiving a selection of a virtual object size. In some embodiments, scale of the scene can be used to automatically select a virtual object size (e.g., dimensions, shape, such as of a table, sofa, bed frame, desk, rug, etc.). In some embodiments, receiving a selection of a virtual object size selection ensures sensible object placement and/or object visibility to the user (e.g., a small rug is not placed under a sofa, which would not visible to the user). In some embodiments, receiving a virtual object size can be based on virtual object re-size tool, that enables the user to re-size the virtual object on the frontend application, as depicted in FIG. 10A.

The selection can optionally include selecting object attributes. The object attributes can be: default values, selected by the user, automatically selected, or otherwise selected. The attributes can be selected: as the virtual object is dragged across the user interface, after a final position selection (e.g., virtual object release by the user), or at another time. In some embodiments, the image of the object changes depending on which surface plane the user is dragging the image across (e.g., the perspective can look different against one wall versus another wall versus floor, the light reflected or cast by the virtual object can change as the object moves through the light vectors, etc.).

Determining a virtual object position functions to determine where the virtual object should be placed within the virtual room. In a first variation, the virtual object position can be determined automatically, based on object class and a set of rules, heuristics, trained module, and/or otherwise determined. In a second variation, the virtual object position can be determined manually. In one example, the user can drag and drop the object into the selected virtual object position. In a second example, the user can tap the virtual object position. In a third example, the user can select the virtual object depth by holding the virtual object over a virtual room region until the virtual object is sent backward. However, the virtual object position can be otherwise manually selected (e.g., using human assistants). However, the virtual object position can be determined randomly or otherwise determined.

In variants, virtual object placement can be subject to a set of rules or heuristics, but can alternatively be unconstrained or otherwise constrained. The heuristics can be: predetermined, automatically determined based on room information (e.g., determined from the virtual room), or otherwise determined. In an illustrative example, the system and method precludes a couch from being placed within an existing sofa or in a region with a non-visible floor.

In one example, design rules can include regions tagged with a label associated with the object, planar surfaces with a surface normal orientation associated with the object, planar surfaces with a mask and/or a white list admitting the object into the mask, planar surfaces with a mask and/or a black list excluding objects other than the object (for the mask), or any other suitable set of rules. In a preferred embodiment, the masking applies to object placement, such that a user cannot select portions of the image that are designated within one of the masks (e.g., a foreground mask or a background mask), which are designated areas where objects cannot be placed.

In a second example, rules can specify that paint can only be on walls, flooring can only be on floors (e.g., regions tagged with "floor", planar surfaces with a surface normal that parallels a gravity vector, planar surfaces with a whitelist admitting flooring, planar surfaces with a blacklist (excluding objects sans flooring, etc.) Small items, (e.g. books), can only be placed on cabinets or mantles, or any other suitable set of rules.

In a third example, the rules can be physics rules, where an object position can be considered valid by modelling the physics of the object (e.g., using a physics simulator) based on object characteristics (e.g., flexibility, stiffness, etc.), the surface normal vectors of the object masks, the surface normal vectors of the virtual object. Analyzing the received position can include determining a position is valid by evaluating the position based on a set of guidelines (e.g., design rules), based on metric scale measurements of the virtual object compared to the metric scale measurements of the virtual model, and/or based on any other suitable information. When a position is determined to be invalid, the method can include automatically determining a valid position for the virtual object such as based on the above information and/or any other information.

The method can optionally include receiving a selection of a virtual object orientation. The virtual object orientation can be: a default orientation, a manually selected orientation (e.g., the user rotates the virtual object), automatically determined (e.g., based on a set of rules, aligned based on a virtual gravity vector, the surface normal of the planar surface being proximal to the virtual object's selected position, etc.), or otherwise determined.

Rendering an updated virtual room visual representation based on the virtual object S500 functions to provide a photorealistic image of the room, including the virtual object. For example, S500 can render the virtual object, located at the virtual object position, into an updated VRVR based on the virtual room model. S500 can be performed at the backend platform (e.g., at a remote computing system), at a user device, at the frontend application, or by any other suitable system. The virtual object rendering can be performed using: a graphics library (e.g., WebGL), hardware or software rendering, neural networks with a combination of post-processing with heuristics, or otherwise rendered.

In one variation, the virtual object is rendered (e.g., warped using the geometry associated with the target planar surface, shaded using the associated highlights and shadows, etc.; example shown in FIG. 5), and the rendered virtual object is overlaid over the photorealistic image (e.g., according to the display rules masks, etc.). Rendering can include warping the virtual object based on the virtual room model (e.g., based on the features such as the geometries, plane equations, and/or surface normals of the planar surface associated with the virtual object location), example shown in FIG. 12B. Rendering can optionally include masking out any overlapping foreground objects (e.g., using the associated foreground mask) and/or applying any shadows or lighting associated with said foreground mask (e.g., wherein the shadows or lighting can be associated with a semi-transparent mask, be associated with a shadow or lighting vector, be associated with the foreground object's geometry, or be otherwise determined).

In a second variation, S500 can include: arranging the virtual object model at the virtual object position within the virtual room model; projecting the resultant virtual model into a virtual camera's reference frame, such that only the points or voxels closest to the virtual camera are shown; and rendering the pixels corresponding to the points or voxels from the respective virtual object and/or virtual room visual representations.

In a third variation, S500 includes rendering a convex hull of the virtual object and overlaying a surface mesh associated with the virtual object over the convex hull (e.g., such as to reduce rendering time and computational resources).

Figure 14A:
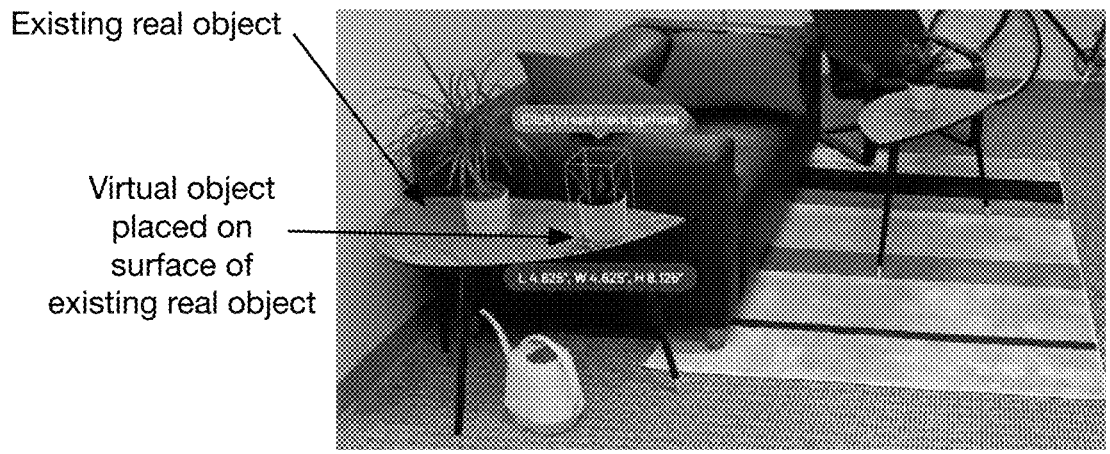
FIG. 14A-14C depict examples of virtual object positioning.
Figure 14B:
Figure 14C:
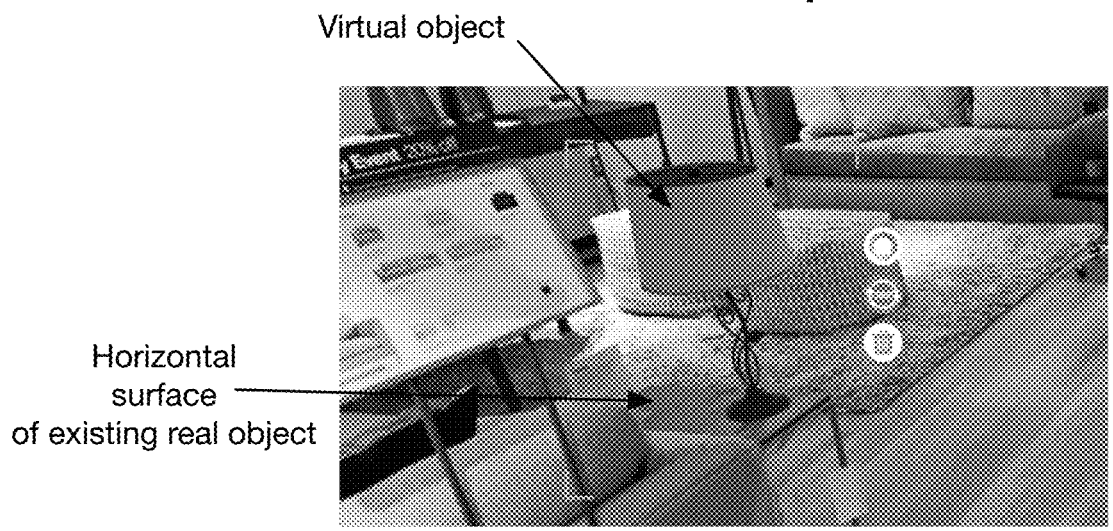

In some embodiments, as depicted in FIGS. 14A-14C, rendering includes rendering virtual objects on top of existing furniture objects, such as placing virtual objects arbitrarily on a depth map of an existing object (e.g., based on the surface normal vectors associated with the depth map), and/or arbitrarily on a depth map of an existing virtual object.

Figure 12A:
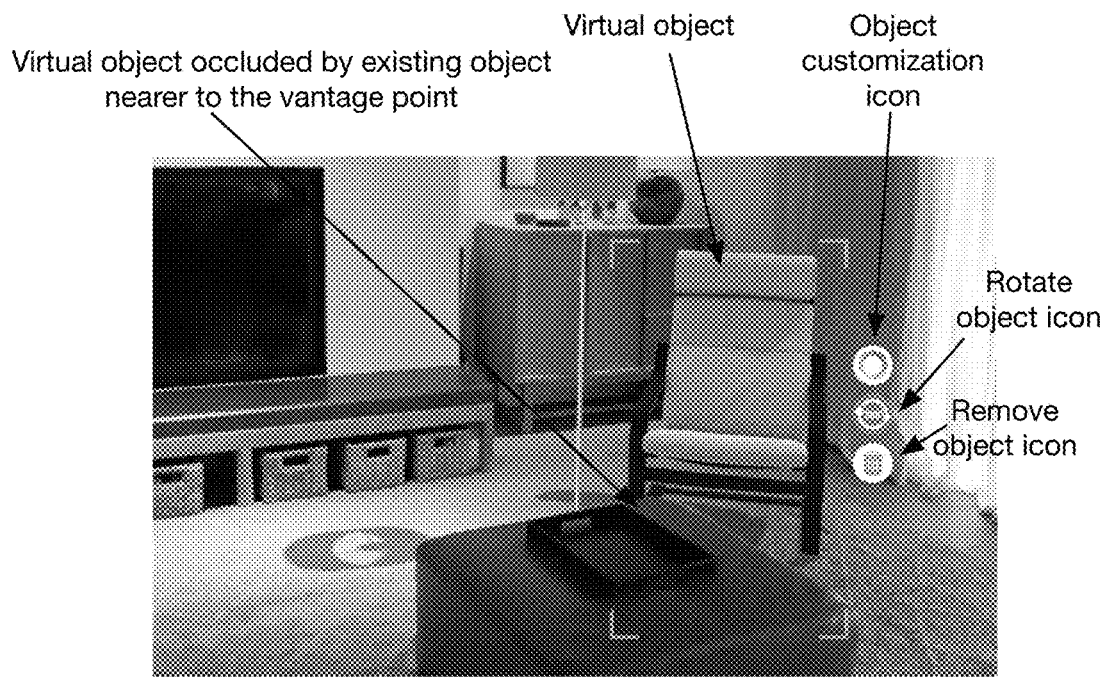
FIGS. 12A-12B depict examples of virtual object positioning.
Figure 12B:
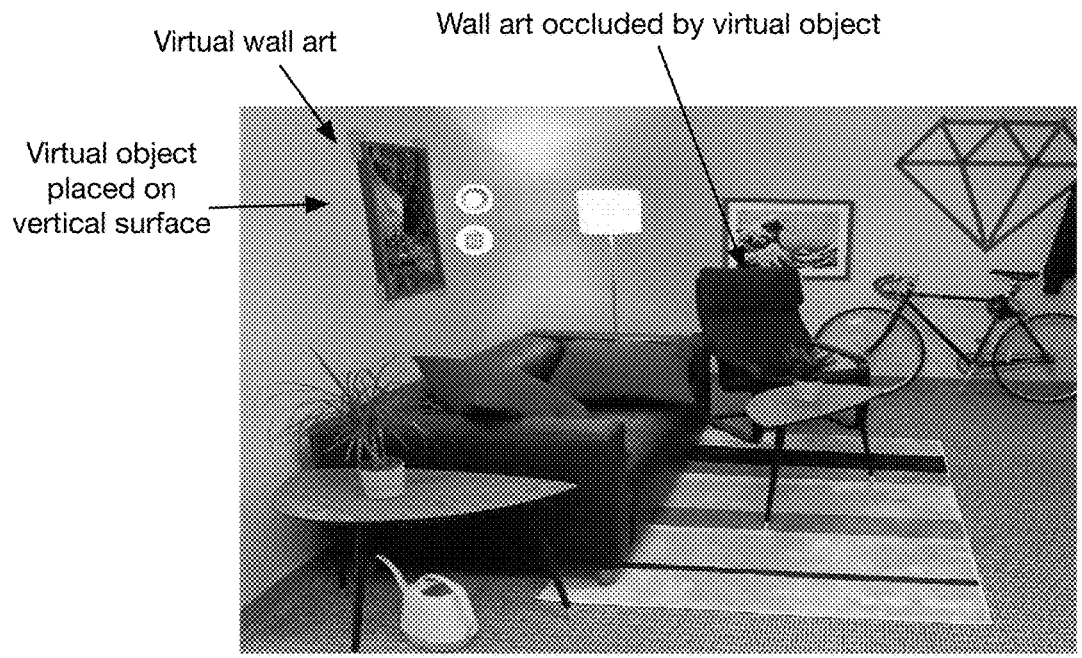

In a fourth variation, S500 includes rendering virtual objects based on the position and/or vantage point associated with the room imagery. Rendering virtual objects based on the position can include determining an existing virtual or real object is occluded by the virtual object (e.g., that the virtual object is in front of the existing object), such as depicted in FIGS. 12A-12B. In a first embodiment, determining that the virtual object is in front of an existing object can include comparing the depths between pixels in the same x coordinate and y coordinate region (e.g., the same pixel, a cluster of pixels, such as radius 2, 3, 4, 5, 6, 7, 8, 9, 10, 15, 20, 25, 30, etc.), wherein the virtual object visual representation (or portion thereof) that is in front is rendered.

Figure 13:
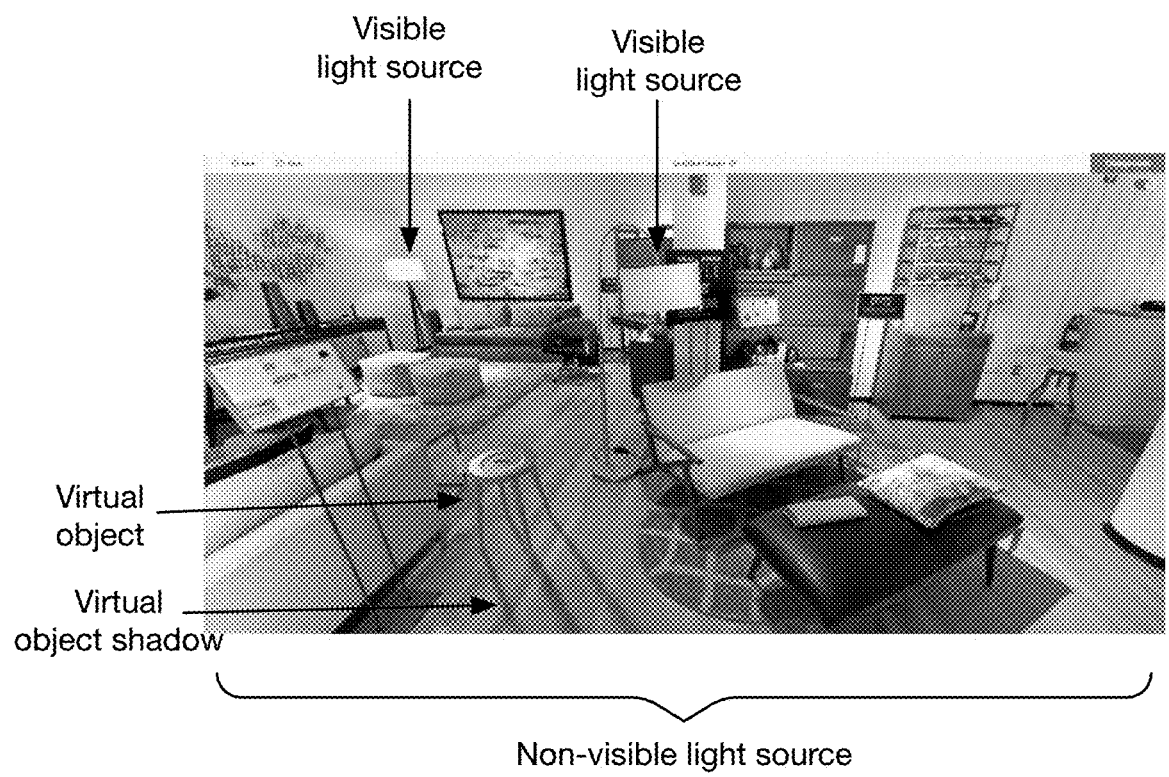
FIG. 13 depicts an example of rendered room imagery based on detected light sources.

Rendering can also include modifying the virtual object based on auxiliary room features such as color, noise, exposure, shadows and highlights (e.g., using respective masks, variable values, etc.). These features can include: color balance (e.g., understanding the overall color in general, are lights overall yellow, blue, etc.); ambient light estimation (e.g., how bright or dark the room is; for example, how many photons would be hitting this object); shadows (e.g., since if a customer doesn't see any shadows on an added object, the scene often looks fake); noise (e.g., to match the virtual object's visual representation to the room's visual representation); and/or any other suitable visual feature. In some embodiments, shadows can be based on dominant light directions, for example, directional lighting, e.g., light from in front, from the side, et cetera. In some embodiments, the directional lighting can come from user input on what dominant light directions are, or alternatively, automatically detected. In some embodiments, shadows are rendered before being sent to a device or browser. Alternatively, shadows are rendered after being sent to the device or browser. A specific example of rendering a virtual object based on light sources is depicted in FIG. 13.

In some embodiments, rendering can include incrementally improving the rendered VRVR. Incrementally improving VRVR can include improving the quantity and/or quality of shadows, such as by egressing data from the pipeline incrementally to gradually improve the quality and realism of the scene. Incrementally improving the VRVR can optionally include incrementally updating the corresponding virtual room model's quality (e.g., depth or surface normal accuracy or resolution, etc.) and/or virtual object models' quality (e.g., depth or surface normal accuracy or resolution, etc.). Additionally or alternatively, different portions of the updated virtual room can be rendered (and provided to the display device) according to a predefined order to decrease the amount of time that a user needs to wait for the updated VRVR. In one example, the following can be provided, in the following order as they are generated or refined: VRVR and floor plane; then the depth map (and/or point cloud) for occlusions; then the lighting for shadows and highlights; then the walls; then wider angle views; then other room data. In a specific example, the VRVR can include a wide angle image and an updated VRVR can include a 360 degree panorama. However, the room data can be provided in any other suitable order.

In examples, the depths of the virtual room model can be periodically refined over time such as from adding more capture data to the model, refining the depth estimates using more data sources (e.g., depth estimates from neural networks, metric scale measurements, optical flow, photogrammetry, user updated metric scale measurements, such as depicted in FIG. 15, and/or higher resolution object masks, such as for virtual objects, and/or existing objects), and/or the depths can be otherwise refined. Additionally, the light direction vectors and/or masks can be refined over time. For example, the scene can first be rendered with the dominant light direction vectors, then the rendered scene can be updated to include additional light direction vectors. The shadows in the scene can also be periodically refined. For example, refined shadows, such as multiple shadows can be drawn per object based on the dominant light directions and/or the additional light directions. In a specific example, the scene can first be rendered to include a single shadow per object (virtual and/or real) and/or no shadows per object. Then an updated scene can be rendered, such as based on the dominant and additional light sources, to include multiple shadows per object.

Features can also include highlights. In some embodiments, highlights can be determined using intrinsic image decomposition or highlight decomposition algorithms.

These are algorithms that will attempt to pull off the highlight lights from the room imagery or photorealistic image. For example, light patterns on the wall can be lights, or can be painted on the wall. In some embodiments, highlights can be determined using user input, neural networks, heuristics, or other methods. Features can also include noise harmonization, (e.g., to match the visual noise level of the added objects match the visual noise level of the scene).

Features can also include viewpoint variable lighting, (e.g., changing the lighting as the user pans around the virtual room or rotates to different angles), such that the exposure of each visual data element (e.g., room image) changes as the user moves around during capturing sessions. In variants, viewpoint variable lighting can be achieved by: providing an equation, direction, and/or other parameters of the light to the front-end application, wherein the front-end application calculates the resultant highlights on the image (e.g., based on the room geometry and the light parameters) and renders the resultant highlights on the photorealistic image and/or added virtual objects. Viewpoint-variable lighting can optionally include dynamically adjusting contrast based on the angle of the lighting source relative to the viewpoint. For example, as a user rotates the camera, the user might stare right into the window which is back lighting. This is taken into account within rendering to balance image lighting, such as by decreasing the contrast between the objects through window and the interior objects.

However, the VRVR can be otherwise modified. Examples of modifications can include: generation or modification of realistic shadows, generation or modification of realistic lighting, highlights modification or enhancements, color modifications or enhancements, noise modification or enhancements, including algorithms for adding noise, denoising, and re-noising. In a specific example, this can include adding noise to art when there is noise in the captured photo itself for consistency. In another version of rendering the virtual room, re-rendering wide-angled images to further include the one or more selections of objects is performed at S320. In a preferred embodiment, objects are rendered within a scene of the wide-angled image based on the one or more extracted feature values. In some embodiments, harmonization of features between added objects and the room is employed for visual consistency. In some embodiments, the system uploads rendered images to cloud storage.

In some embodiments, rendering includes modifying the existing real and/or existing virtual objects based on the virtual object selection (e.g., wherein the virtual object selection is a light source). Modifying the objects can include modifying auxiliary room features based on the virtual object selection features (e.g., the color of the light, brightness, etc.), modifying the virtual objects (e.g., existing and/or new objects) based on movement of another virtual object (e.g., wherein the moved object is a light source and/or wherein the moved object is any other virtual object, such as the moved virtual object can cast updated shadows, and/or occlude a different set of objects, etc.), erasing the existing objects and or virtual objects, and/or otherwise modifying objects within the scene.

Providing the updated virtual room visual representation to the display device S600, functions to provide the updated rendered VRVR for display on one or more devices. S600 is preferably performed similarly to S300, but can be otherwise performed.

Updating virtual room parameters S700 functions to update the room data, such as the room scale or room dimensions. S700 can be manually performed (e.g., in response to receiving user edited room data), automatically performed (e.g., based on automatic identification of objects with known measurements), or otherwise performed. S700 is preferably performed on a UI (user interface) for the user viewing the room imagery, with one or more rendered VRVRs displayed, and/or one or more editing tools (e.g., button, knob, wheel, icon, slider, text entry, etc.) available.

In some embodiments, receiving user edited room data can include displaying approximated measurements and/or angles between planes (e.g., between two parallel surfaces and/or planes determined based on surface normal vectors associated with the object masks, between two perpendicular surfaces, etc.). Receiving user edited room data can include receiving user refined measurements between parallel planes and/or refined angles between perpendicular planes. For example, a first plane and/or surface can include a floor, a ceiling, wall, and/or a surface of an object (e.g., existing, virtual, etc.), and a second surface can include a ceiling, a wall, a surface of an object (e.g., height of an existing and/or virtual object, such as the height of an existing coffee table). The user can edit the measurement between the first surface and the second surface based on an actual measurement and/or an approximate measurement. A specific example of updating metric scale measurements is depicted in FIG. 15.

In some embodiments updating room data includes detecting a common known-size objects in the scene; determining measurements of the common-known size objects (e.g., database lookup, such as using the virtual object repository); and re-rendering based on the common known-size object measurements.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method executed by one or more computing devices for interactively decorating a scene, the method comprising:
generating a three-dimensional virtual model representing three-dimensional geometries of the scene and a plurality of scene features based at least in part on a plurality of two-dimensional images of the scene;
determining a plurality of scene object masks for a plurality of scene objects appearing within the scene based at least in part on the plurality of images, each scene object mask comprising a set of scene object pixels corresponding to an associated scene object and at least one scene object semantic label corresponding to the associated scene object;
generating a visual scene representation based at least in part on the plurality of images, the visual scene representation being aligned with the three-dimensional geometries of the scene represented in the virtual model;
receiving a virtual object selection, the virtual object having an associated virtual object mask, the associated virtual object mask comprising a set of virtual object pixels corresponding to the virtual object and at least one virtual object semantic label corresponding to the virtual object;

determining a virtual object position for the virtual object within the three-dimensional virtual model based at least in part on the set of virtual object pixels, the at least one virtual object semantic label, one or more scene object masks in the plurality of scene object masks, and one or more positioning rules governing object positioning within the three-dimensional virtual model;

rendering an updated visual scene representation based at least in part on the virtual object, the virtual object position, the three-dimensional virtual model, and the plurality of object masks, wherein rendering comprises modifying an appearance of the virtual object based at least in part on one or more scene features in the plurality of scene features; and transmitting the updated visual scene representation for display on a display device.

2. The method of claim 1, wherein the virtual object comprises at least one of: wall art, furniture, and floor coverings.

3. The method of claim 1, wherein receiving a virtual object selection comprises:
receiving an identifier for the virtual object; and
retrieving the virtual object from a database, based at least in part on the identifier.

4. The method of claim 1, wherein receiving a virtual object selection comprises:
selecting the virtual object based at least in part on one or more scene features in the plurality of scene features and at least one of a trained neural network, a rule set, and a heuristics set.

5. The method of claim 1, wherein transmitting the updated visual scene representation for display on a display device comprises:
transmitting a low-quality version of the updated visual scene representation; and
successively transmitting higher-quality versions of the updated visual scene representation over time, as higher-quality versions of the updated visual scene representations are successively rendered.

6. The method of claim 1,
wherein each scene object pixel in the set of scene object pixels of each scene object mask is associated with a respective virtual position within the three-dimensional virtual model; and
wherein rendering the updated visual scene representation comprises:
determining a positional relationship between the virtual object mask and the plurality of scene object masks based at least in part on the virtual object position and the respective virtual positions of the set of scene object pixels of the plurality of scene object masks; and
rendering the updated visual scene representation based at least in part on segments of the plurality of scene object masks and the virtual object mask that are most proximal to a virtual camera.

7. The method of claim 6, wherein rendering the first updated visual scene representation based at least in part on the segments of the plurality of scene object masks and the virtual object mask that are most proximal to a virtual camera comprises:

determining that at least a portion of the virtual object is in front of at least a portion of a scene object in the plurality of scene objects based at least in part on a comparison between the respective virtual positions of the set of scene object pixels and the virtual object position associated with the virtual object.

8. The method of claim 1, further comprising:
presenting a scale measurement between a first and a second end of an editable virtual object within the first updated visual scene representation;
receiving an updated scale measurement for the virtual object from a user;
rescaling the three-dimensional virtual model based on the updated scale measurement;
rendering a second updated visual scene representation based at least in part on the rescaled three-dimensional virtual model; and
transmitting the second updated visual scene representation for display on the display device.

9. The method of claim 1, wherein each scene object mask is associated with a set of surface normal vectors and wherein determining a virtual object position for the virtual object within the three-dimensional virtual model comprises:
determining a physical characteristic associated with the virtual object based at least in part on the at least one virtual object semantic label; and
positioning the virtual object at the virtual object position within the three-dimensional virtual model, based at least in part on the physical characteristic, a plurality of sets of surface normal vectors associated with the plurality of scene object masks, and a positioning rule in the one or more positioning rules.

10. The method of claim 1, wherein determining a virtual object position for the virtual object within the three-dimensional virtual model comprises:
determining a positioning rule associated with the virtual object;
identifying a scene object mask in the plurality of scene object masks that is at least partially adjacent to the virtual object mask, based at least in part on the virtual object pixels;
determining that a first surface of the scene object mask proximal to the virtual object satisfies the positioning rule based at least in part on a set of surface normal vectors of the scene object mask; and
in response to positioning rule satisfaction, positioning the virtual object on the first surface.

11. The method of claim 1, wherein the virtual object selection is received from a first user, wherein the method further comprises:
after transmitting the first updated visual scene representation, receiving a second virtual object selection from a second user different from the first user;
rendering a second updated visual scene representation depicting the second virtual object; and
transmitting the second updated visual scene representation for display on a second display device associated with the second user.

12. The method of claim 1, wherein the plurality of scene features comprise one or more of: color balance, noise, exposure, shadows, highlights, light sources, ambient lighting, or a gravity vector.

13. The method of claim 1, wherein the plurality of scene features comprise light sources and shadows and wherein modifying an appearance of the virtual object based at least in part on one or more scene features in the plurality of scene features comprises one or more of:
- adding one or more shadows to the virtual object based at least in part on one or more locations of one or more light sources in the three-dimensional virtual model and one or more scene object masks in the plurality of scene object masks; or
- modifying one or more of a brightness or color of the virtual object based at least in part on one or more locations of one or more light sources in the three-dimensional virtual model.

14. The method of claim 1, wherein the virtual object comprises a scene object in the plurality of scene objects.

15. The method of claim 1, wherein the at least one scene object semantic label identifies one or more of: a scene object type, a scene object material, a scene object fabric, or a scene object characteristic.

16. The method of claim 1, wherein the at least one virtual object semantic label identifies one or more of: a virtual object type, a virtual object material, a virtual object fabric.

17. The method of claim 1,
wherein determining a virtual object position for the virtual object within the three-dimensional virtual model based at least in part on the set of virtual object pixels, the at least one virtual object semantic label, one or more scene object masks in the plurality of scene object masks, and
one or more positioning rules governing object positioning within the three-dimensional virtual model comprises:
identifying a scene object mask of a scene object proximate to a proposed virtual object position;
determining whether the at least one virtual object semantic label is compatible with at least one scene object semantic label of the identified scene object mask; and
accepting the proposed virtual object position based at least in part on a determination that the at least one virtual object semantic label is compatible with the at least one scene object semantic label of the identified scene object mask.

18. The method of claim 1, further comprising:
receiving a position selection within the visual scene representation;
wherein the virtual object position for the virtual object within the three-dimensional virtual model is determined based at least in part on the received position selection.

19. The method of claim 1,
wherein the plurality of scene features comprise a gravity vector and
wherein determining a virtual object position for the virtual object within the three-dimensional virtual model based at least in part on the set of virtual object pixels, the at least one virtual object semantic label, one or more scene object masks in the plurality of scene object masks, and one or more positioning rules governing object positioning within the three-dimensional virtual model comprises:
determining an orientation for the virtual object based at least in part on the virtual object semantic label, the gravity vector, and a gravity vector positioning rule in the one or more positioning rules; and
determining the virtual object position for the virtual object in the determined orientation based at least in part on the set of virtual object pixels, the at least one virtual object semantic label, one or more scene object masks in the plurality of scene object masks, and the one or more positioning rules.

20. The method of claim 19,
wherein determining the virtual object position for the virtual object in the determined orientation based at least in part on the set of virtual object pixels, the at least one virtual object semantic label, one or more scene object masks in the plurality of scene object masks, and the one or more positioning rules governing object positioning within the three-dimensional virtual model comprises:
applying one or more physics rules in the one or more positioning rules to the virtual object pixels and the one or more scene object masks to determine the virtual object position for the virtual object.

21. The method of claim 1, wherein the plurality of scene features comprise a plurality of object depth estimates corresponding to the plurality of scene objects and further comprising:
iteratively refining the plurality of object depth estimates over time based at least in part on one or more of: neural network estimates, metric scale measurements, optical flow, photogrammetry, or user updated metric scale measurements.

22. An apparatus for interactively decorating a scene, the apparatus comprising:
one or more processors; and
one or more memories operatively coupled to at least one of the one or more processors and having instructions stored thereon that, when executed by at least one of the one or more processors, cause at least one of the one or more processors to:
generate a three-dimensional virtual model representing three-dimensional geometries of the scene and a plurality of scene features based at least in part on a plurality of two-dimensional images of the scene;
determine a plurality of scene object masks for a plurality of scene objects appearing within the scene based at least in part on the plurality of images, each scene object mask comprising a set of scene object pixels corresponding to an associated scene object and at least one scene object semantic label corresponding to the associated scene object;
generate a visual scene representation based at least in part on the plurality of images, the visual scene representation being aligned with the three-dimensional geometries of the scene represented in the virtual model;
receive a virtual object selection, the selected virtual object having an associated virtual object mask, the associated virtual object mask comprising a set of virtual object pixels corresponding to the selected virtual object and at least one virtual object semantic label corresponding to the selected virtual object;
determine a virtual object position for the virtual object within the three-dimensional virtual model based at least in part on the set of virtual object pixels, the at least one virtual object semantic label, one or more scene object masks in the plurality of scene object masks, and one or more positioning rules governing object positioning within the three-dimensional virtual model;
render an updated visual scene representation based at least in part on the virtual object, the virtual object position, the three-dimensional virtual model, and the plurality of object masks, wherein rendering comprises modifying an appearance of the virtual object based at least in part on one or more scene features in the plurality of scene features; and transmit the updated visual scene representation for display on a display device.

23. The apparatus of claim 22, wherein the instructions that, when executed by at least one of the one or more processors, cause at least one of the one or more processors to determine a virtual object position for the virtual object within the three-dimensional virtual model further cause at least one of the one or more processors to:

determine a positioning rule associated with the virtual object;

identify a scene object mask in the plurality of scene object masks that is adjacent to a bottom of the virtual object mask, based at least in part on the virtual object pixels;

determine that a first surface of the scene object mask proximal to the virtual object satisfies the positioning rule based at least in part on a set of surface normal vectors of the scene object mask; and in response to positioning rule satisfaction, position the virtual object on the first surface.

24. At least one non-transitory computer-readable medium storing computer-readable instructions for interactively decorating a scene that, when executed by one or more computing devices, cause at least one of the one or more computing devices to:

generate a three-dimensional virtual model representing three-dimensional geometries of the scene and a plurality of scene features based at least in part on a plurality of two-dimensional images of the scene;

determine a plurality of scene object masks for a plurality of scene objects appearing within the scene based at least in part on the plurality of images, each scene object mask comprising a set of scene object pixels corresponding to an associated scene object and at least one scene object semantic label corresponding to the associated scene object;

generate a visual scene representation based at least in part on the plurality of images, the visual scene representation being aligned with the three-dimensional geometries of the scene represented in the virtual model;

receive a virtual object selection, the selected virtual object having an associated virtual object mask, the associated virtual object mask comprising a set of virtual object pixels corresponding to the selected virtual object and at least one virtual object semantic label corresponding to the selected virtual object;

determine a virtual object position for the virtual object within the three-dimensional virtual model based at least in part on the set of virtual object pixels, the at least one virtual object semantic label, one or more scene object masks in the plurality of scene object masks, and one or more positioning rules governing object positioning within the three-dimensional virtual model;

render an updated visual scene representation based at least in part on the virtual object, the virtual object position, the three-dimensional virtual model, and the plurality of object masks, wherein rendering comprises modifying an appearance of the virtual object based at least in part on one or more scene features in the plurality of scene features; and transmit the updated visual scene representation for display on a display device.

25. The at least one non-transitory computer-readable medium of claim 24, wherein the instructions that, when executed by at least one of the one or more computing devices, cause at least one of the one or more computing devices to determine a virtual object position for the virtual object within the three-dimensional virtual model further cause at least one of the one or more computing devices to:

determine a positioning rule associated with the virtual object;

identify a scene object mask in the plurality of scene object masks that is adjacent to a bottom of the virtual object mask, based at least in part on the virtual object pixels;

determine that a first surface of the scene object mask proximal to the virtual object satisfies the positioning rule based at least in part on a set of surface normal vectors of the scene object mask; and in response to positioning rule satisfaction, position the virtual object on the first surface.

* * * * *